US007127421B1

(12) United States Patent
Beacham et al.

(10) Patent No.: US 7,127,421 B1
(45) Date of Patent: Oct. 24, 2006

(54) METHOD AND SYSTEM FOR IDENTIFYING BOTTLENECKS IN A SECURITIES PROCESSING SYSTEM

(75) Inventors: Michael L. Beacham, Lake Forest, IL (US); Scott M. Lobel, Arlington, VA (US); Wendy Yan, Jersey City, NJ (US); Roy T. Ortman, Bedminster, PA (US)

(73) Assignee: Accenture LLP, Palo Alto, CA (US)

( * ) Notice: Subject to any disclaimer, the term of this patent is extended or adjusted under 35 U.S.C. 154(b) by 581 days.

(21) Appl. No.: 09/696,544

(22) Filed: Oct. 25, 2000

(51) Int. Cl.
*G06Q 40/00* (2006.01)

(52) U.S. Cl. .......................................... 705/35; 703/22
(58) Field of Classification Search .................. 705/35, 705/64, 80, 10, 36, 37, 26; 703/22
See application file for complete search history.

(56) References Cited

U.S. PATENT DOCUMENTS

| | | | | |
|---|---|---|---|---|
| 4,674,044 A | * | 6/1987 | Kalmus et al. | 705/37 |
| 5,126,936 A | | 6/1992 | Champion et al. | |
| 5,497,317 A | * | 3/1996 | Hawkins et al. | 705/37 |
| 5,615,109 A | * | 3/1997 | Eder | 705/8 |
| 5,842,185 A | | 11/1998 | Chancey et al. | |
| 5,918,218 A | * | 6/1999 | Harris et al. | 705/37 |
| 5,919,715 A | * | 7/1999 | Tekeuchi et al. | 438/745 |
| 5,923,552 A | * | 7/1999 | Brown et al. | 700/100 |
| 5,940,809 A | * | 8/1999 | Musmanno et al. | 705/35 |
| 5,946,666 A | * | 8/1999 | Nevo et al. | 705/36 |
| 5,950,176 A | * | 9/1999 | Keiser et al. | 705/37 |
| 6,012,042 A | * | 1/2000 | Black et al. | 705/36 |
| 6,014,643 A | * | 1/2000 | Minton | 705/37 |
| 6,016,483 A | * | 1/2000 | Rickard et al. | 705/37 |
| 6,029,146 A | * | 2/2000 | Hawkins et al. | 705/35 |
| 6,049,783 A | * | 4/2000 | Segal et al. | 705/37 |
| 6,134,535 A | * | 10/2000 | Belzberg | 705/37 |
| 6,141,649 A | * | 10/2000 | Bull | 705/11 |
| 6,247,000 B1 | | 6/2001 | Hawkins et al. | |
| 6,347,307 B1 | | 2/2002 | Sandhu et al. | |
| 2001/0034628 A1 | * | 10/2001 | Eder | 705/7 |
| 2002/0016761 A1 | * | 2/2002 | Foster et al. | 705/37 |
| 2002/0023045 A1 | | 2/2002 | Feilbogen et al. | |
| 2002/0035606 A1 | * | 3/2002 | Kenton | 709/206 |
| 2002/0038276 A1 | | 3/2002 | Buhannic et al. | |
| 2003/0050879 A1 | * | 3/2003 | Rosen et al. | 705/35 |
| 2005/0234807 A1 | * | 10/2005 | Toffey | 705/37 |

FOREIGN PATENT DOCUMENTS

DE  EP 1 503 309 A1 * 2/2005

(Continued)

OTHER PUBLICATIONS

Windows DNA for Financial Services, 1998, 25 pages.*

(Continued)

*Primary Examiner*—Charles R. Kyle
(74) *Attorney, Agent, or Firm*—Fish & Richardson P.C.

(57) ABSTRACT

A method and system for assessing the ability of a securities processing system to apply straight through processing to securities transactions includes identifying one or more assessment issues in an issue and resolution log and capturing process and technology performance information for the securities processing system. The method also includes analyzing the process and technology performance information with respect to the one or more assessment issues and capturing information regarding the ability of at least one system external to the securities processing system to apply straight through processing to securities transactions. The method also includes formulating at least one recommendation, prioritizing the at least one recommendation, and developing an implementation plan.

28 Claims, 29 Drawing Sheets

FOREIGN PATENT DOCUMENTS

| | | | |
|---|---|---|---|
| EP | 0683 466 | A3 | 11/1995 |
| GB | 2258 061 | A | 1/1993 |
| WO | WO 00/31672 | | 6/2000 |
| WO | WO 00/62231 | | 10/2000 |
| WO | WO 01/06392 | A2 * | 1/2001 |
| WO | WO 02/067080 | A2 * | 8/2002 |

OTHER PUBLICATIONS

IEEE/EIA 12207.0-1996, Software Life Cycle Processes, Mar. 1998, 75 pages.*

Tivoli a Project Guide for Deploying Tivoli Solutions, IBM, Apr. 1999, 264 pages.*

Project Management, A Systems Approach to Planning Scheduling and Controlling, Fifth Edition, 1995, pp. 81-85, 469-471, 653-661, 950-961.*

"Asset Management Discover how to get the most from your IT infrastructure, while keeping costs under control", Gartner interactive, May 15-16, 2000, www.gartner11.gartnerweb.com/public/static/events, 3 pgs.

"Electronic Trade Communication", FMC Financial Models, www.fmco.com/fmco/products/fmcnet_1.asp, downloaded Dec. 8, 2000, 2 pgs.

Power Securities System, product information, www.poversecurities.com/index.html, 2000, 4 pgs.

U.S. Appl. No. 09/592,048, filed Jun. 12, 2000.

* cited by examiner

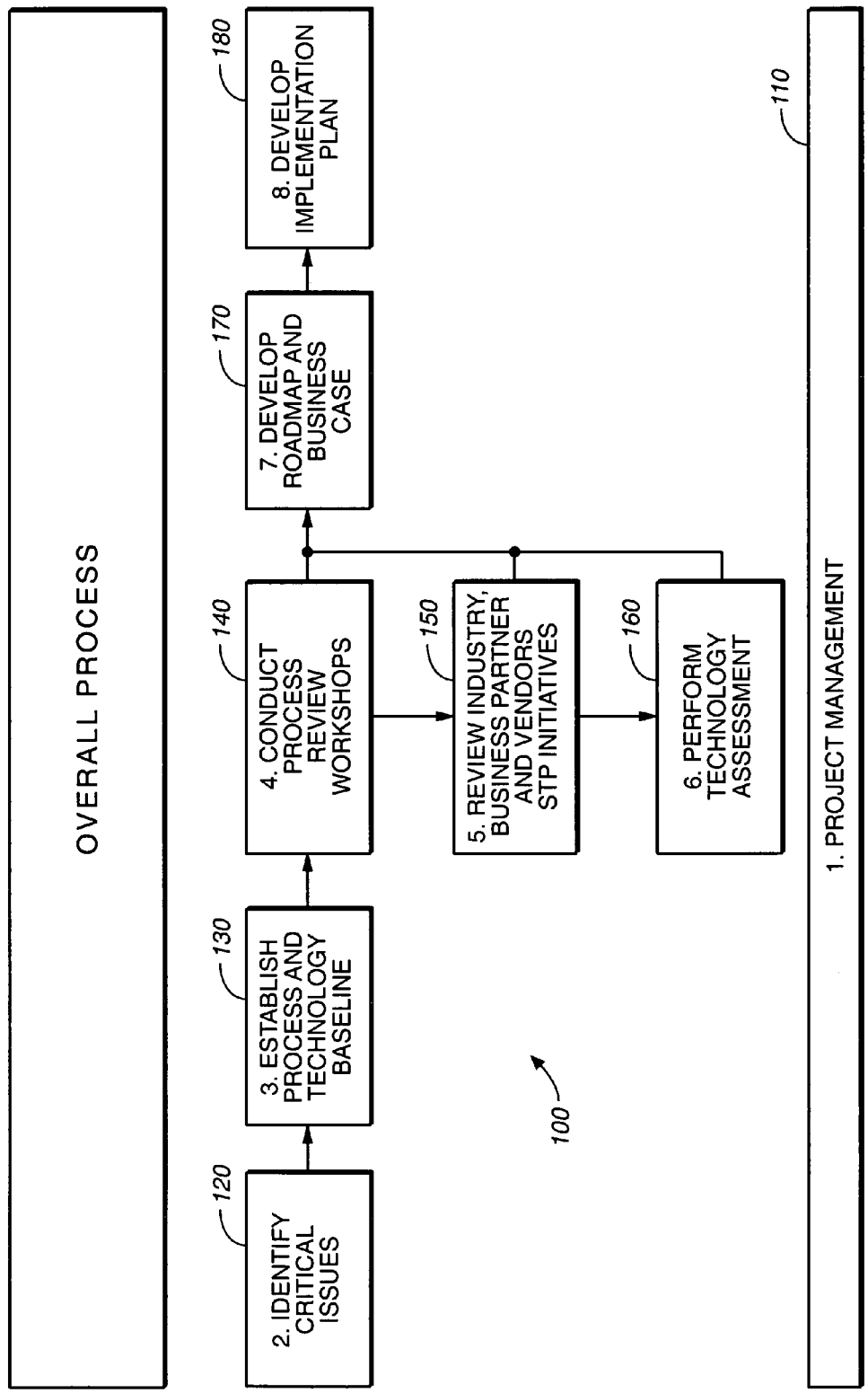

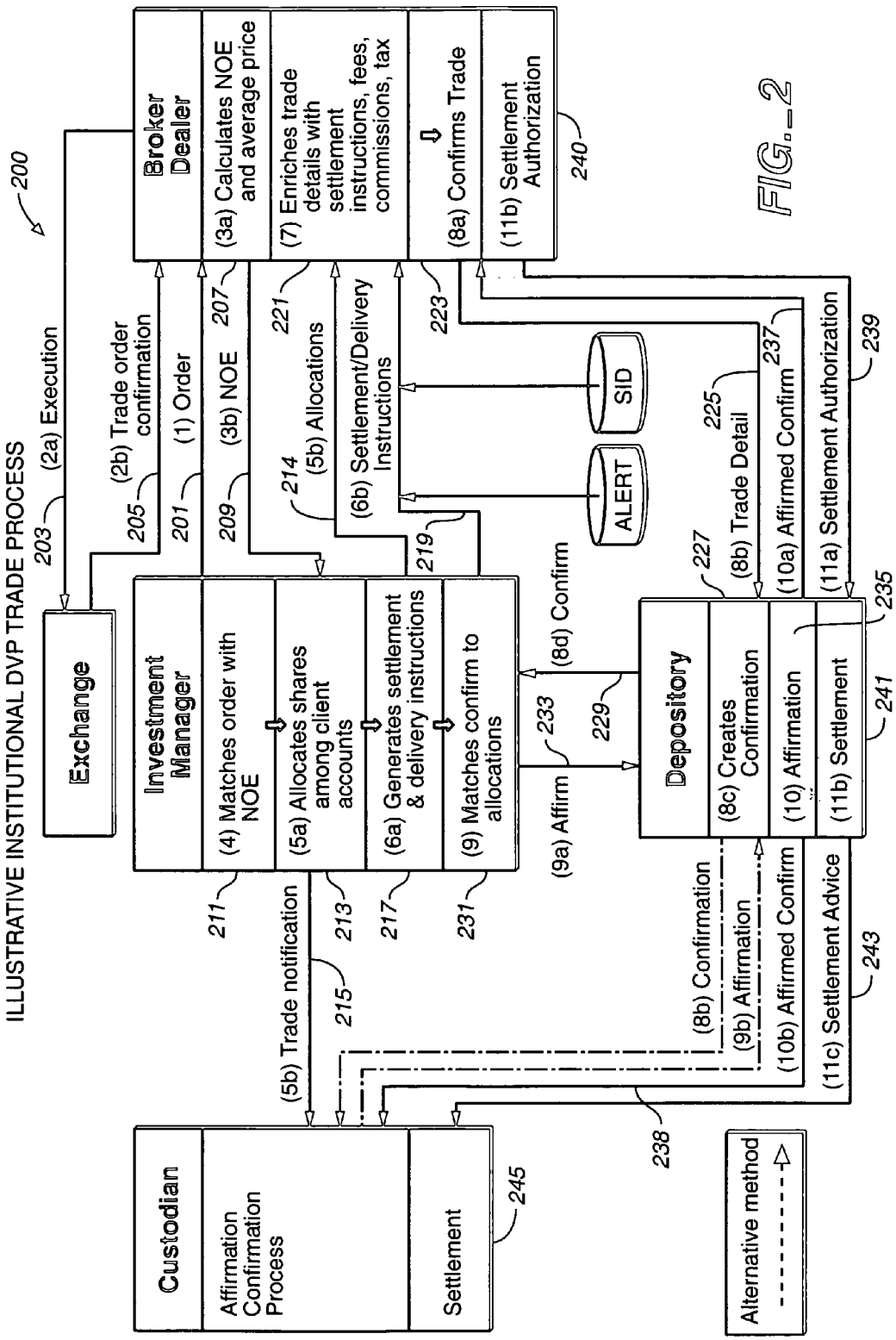

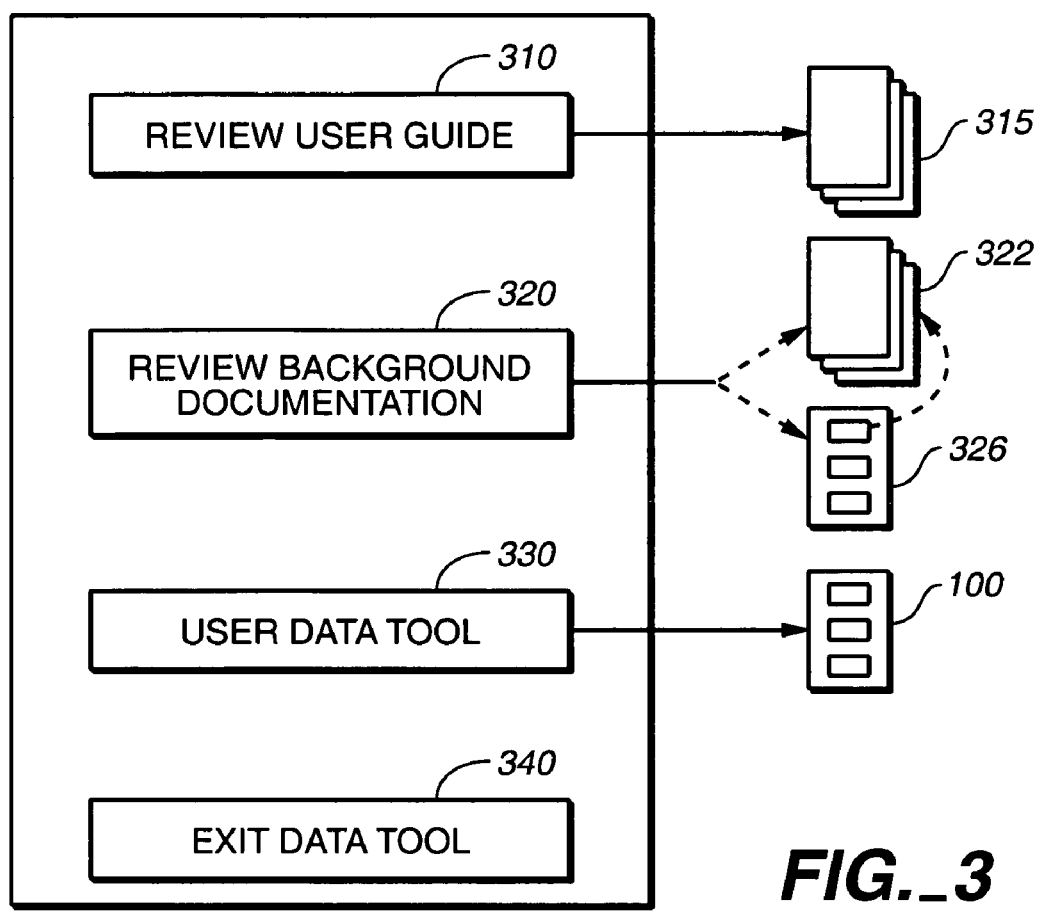
FIG._3

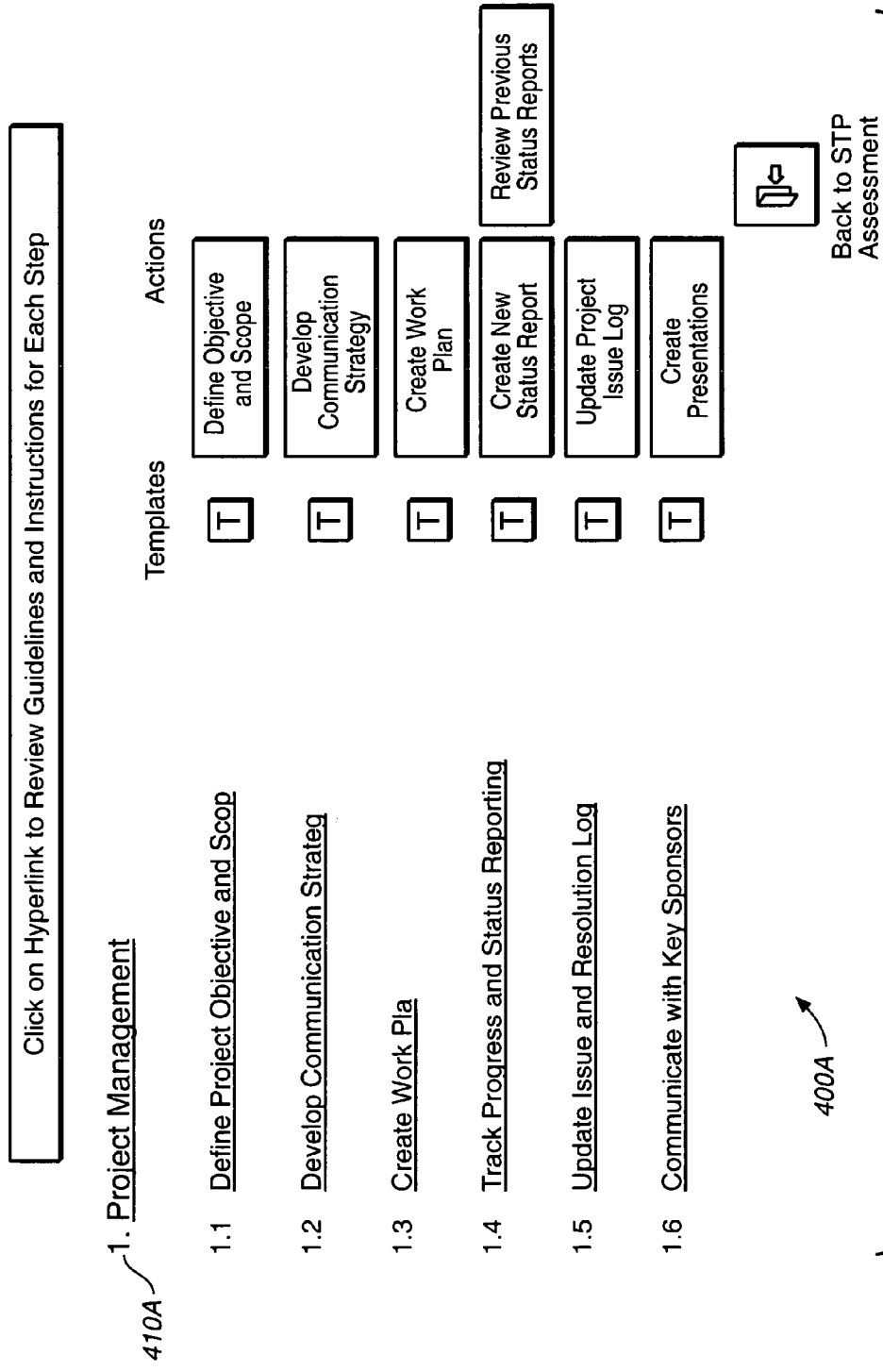
FIG._4A

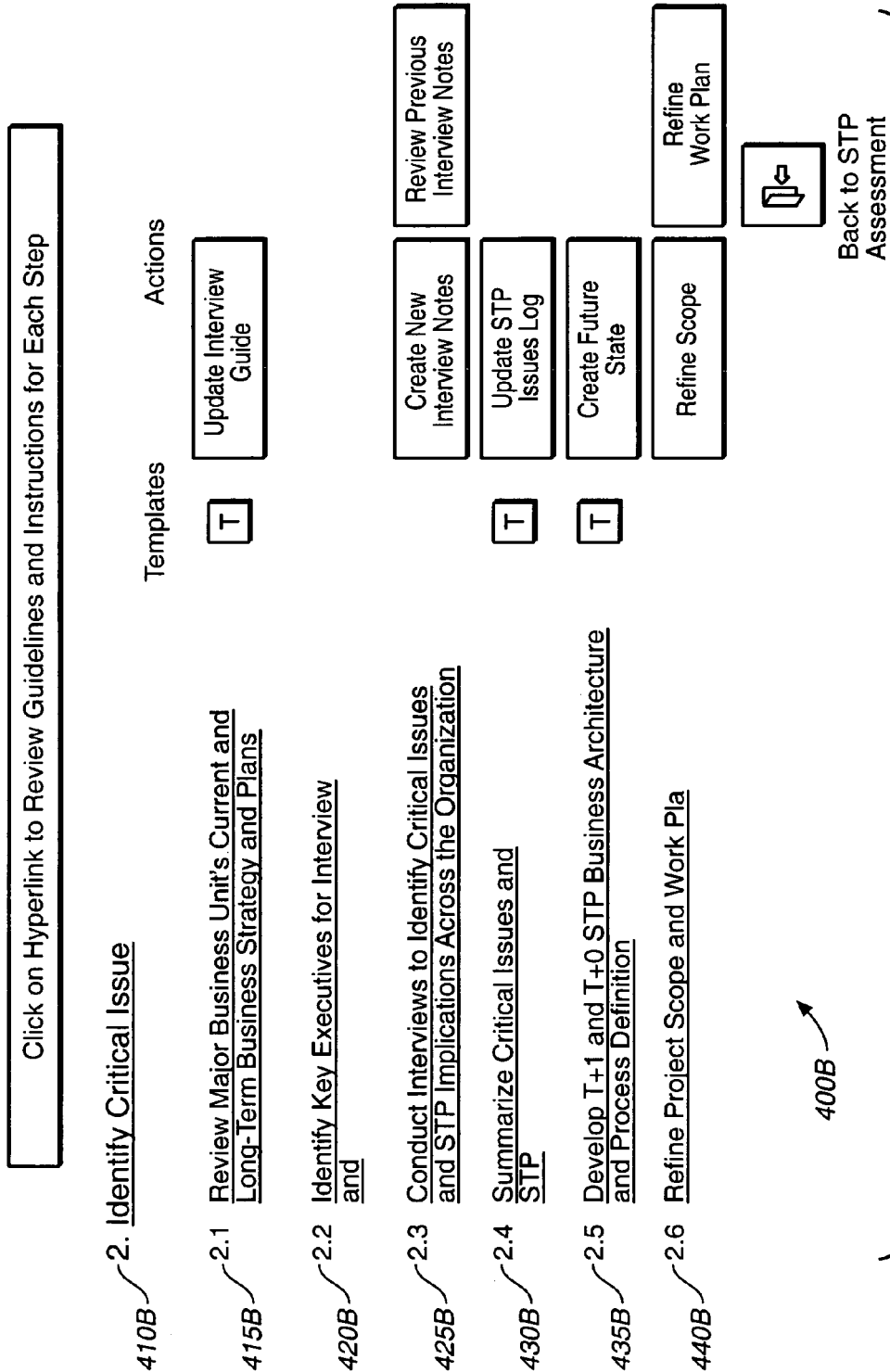
FIG._4B

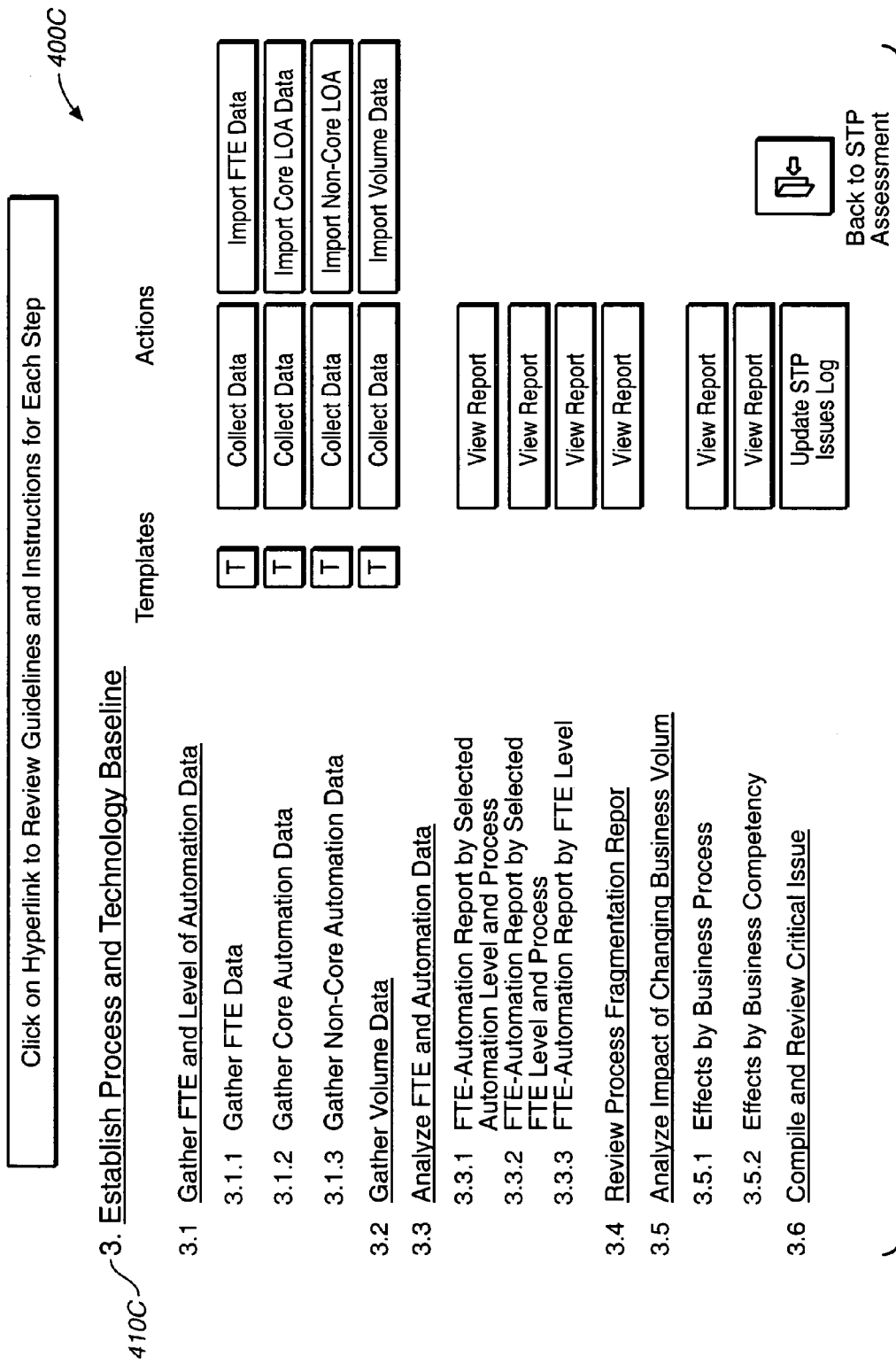
FIG._4C

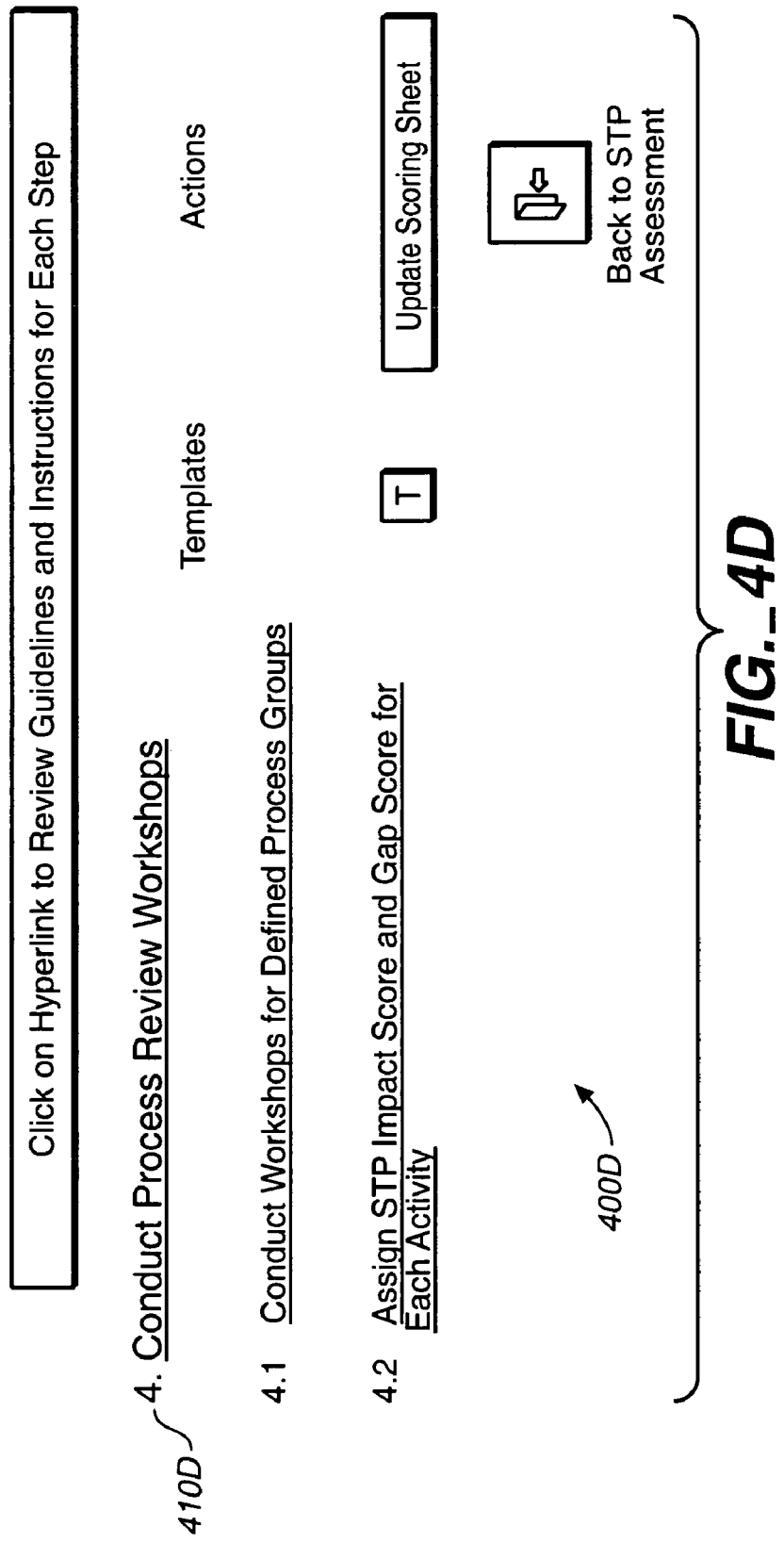
FIG._4D

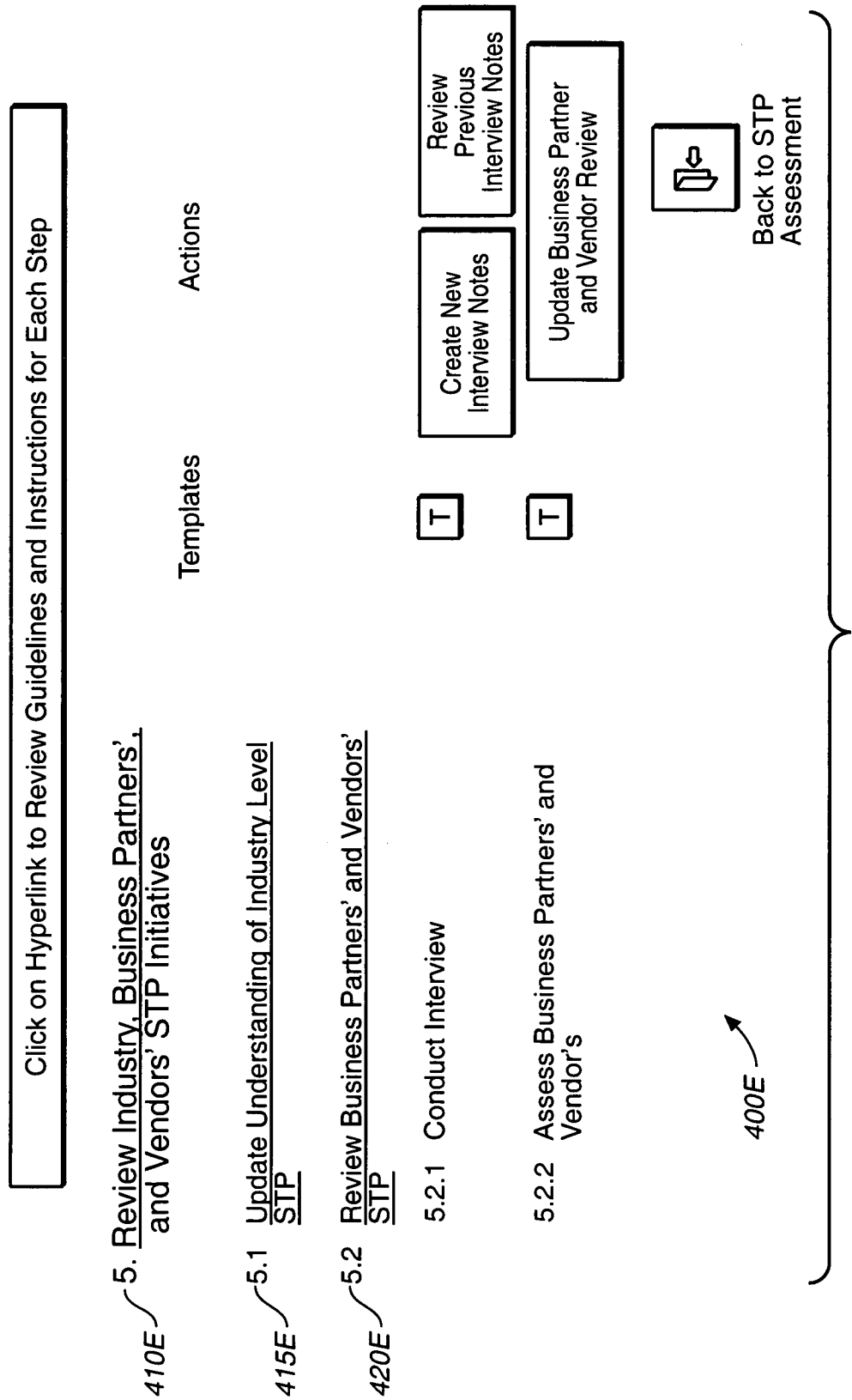
FIG._4E

Click on Hyperlink to Review Guidelines and Instructions for Each Step

6. Perform Technology Assessment

| | Templates | Actions |
|---|---|---|
| 6.1 Map Applications to the Processes/Activities Which They Support | [T] | Update Process/Application Map |
| 6.2 Conduct Funtional/Technical Assessment of Applications | [T] | Update Functional/Technical Assessment |
| 6.3 Conduct IT Infrastructure Assessment | [T] | Update IT Assessment |
| 6.4 Review Current IT Initiatives for Alignment with STP | | Update STP Issues Log |
| 6.5 Assess Opportunities to Leverage Vendor, Business Partner, or Industry Technology | | Update IT Assessment |
| | | Update Functional/Technical Assessment |

Back to STP Assessment

*FIG._4F*

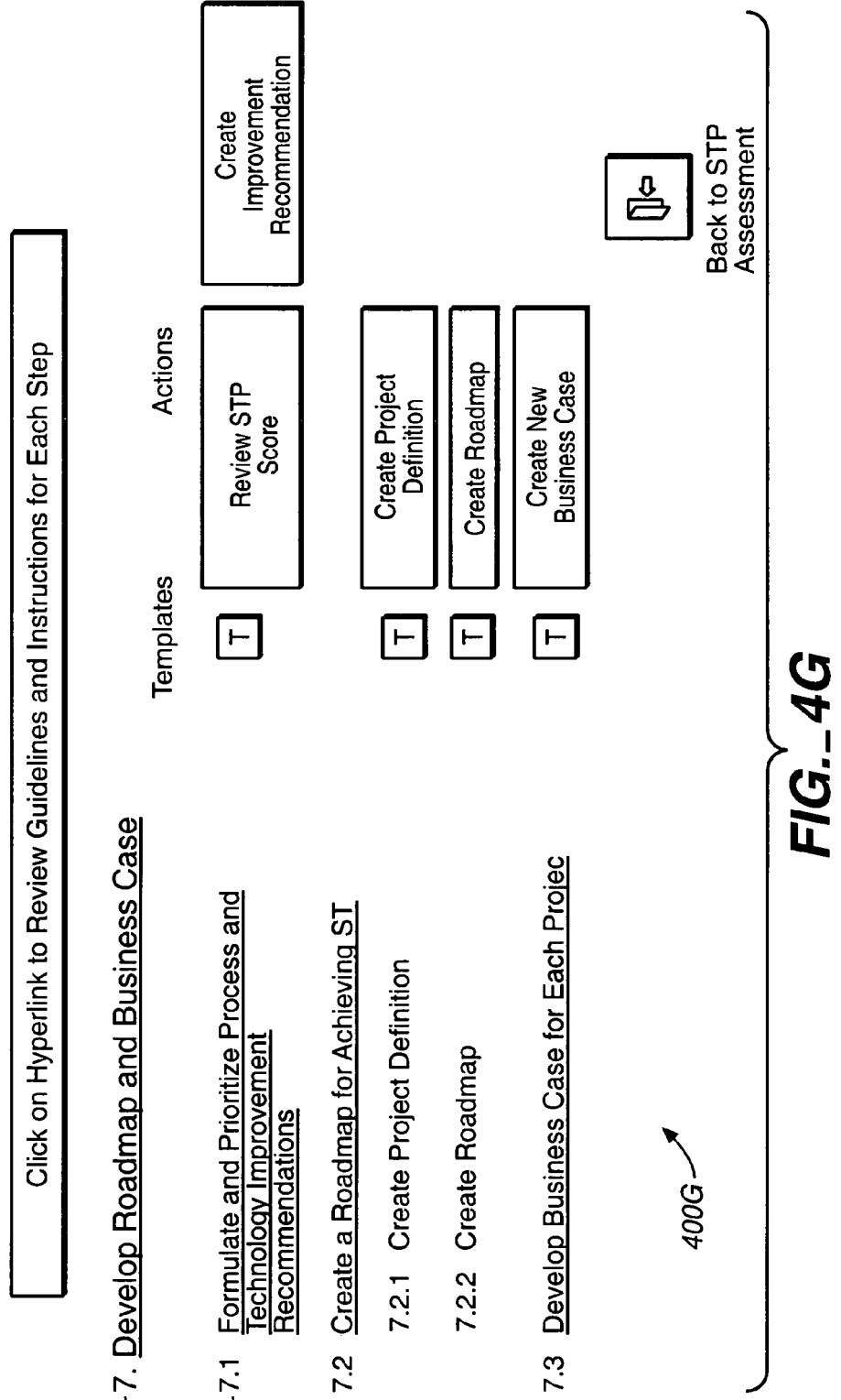
FIG._4G

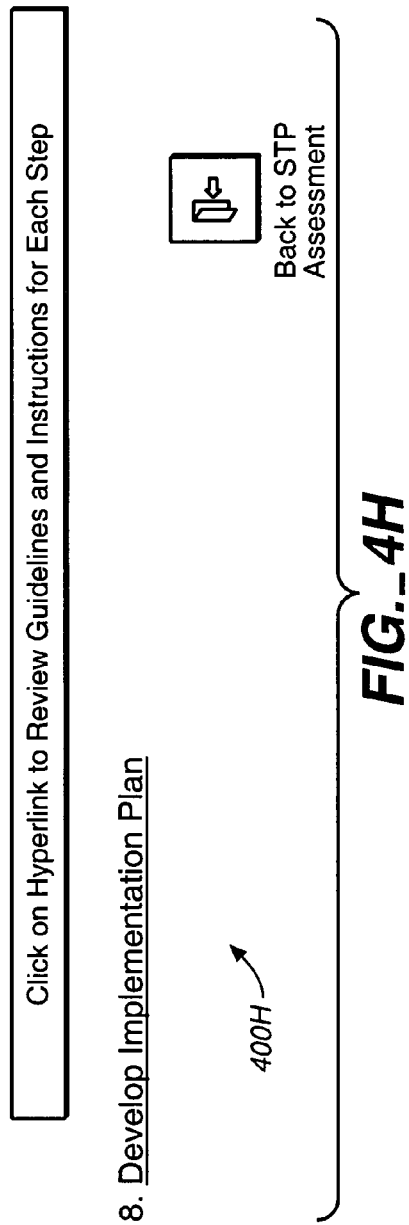

FIG._4H

Guidelines for Team Composition:

| FTE | Role | Skills/experience required |
|---|---|---|
| 1 | Project manager | strong project management experience and skills |
| 3.5 | Process analyst | strong process redesign experience |
| 1 | Application analyst | strong background in application architecture and functional design |
| 1 | Technical analyst | strong background in technical architecture, network architecture, data protocols and Internet technologies |
| 0.5 | Financial analyst | strong business case modeling skills |

FIG._5C

| Step | Task/Subtask | Deliverables | Assigned to | Estimated Man-days | Start Date | End Date |
|---|---|---|---|---|---|---|
| 1. | Project Management | | | | | |
| 1.1 | Define project objective and scope | project objective and scope | | | | |
| 1.2 | Develop communication strategy | communication strategy | | | | |
| 1.3 | Create work plan | work plan | | | | |
| 1.4 | Track progress and status reporting | status reports | | | | |
| 1.5 | Update issue and resolution log | project issue & resolution log | | | | |
| 1.6 | Communicate with key sponsors | | | | | |
| 2. | Identify Critical Issues | | | | | |
| 2.1 | Review major business units' current and long-term business strategy and plans | | | | | |
| 2.2 | Identify key executives for interview and information gathering | | | | | |
| 2.3 | Conduct interviews to identify critical issues and STP implication across the organization | Interview notes | | | | |
| 2.4 | Summarize critical STP issues and implications | STP issue log | | | | |
| 2.5 | Develop T+1 and T+0 STP Business Architecture and Process Definition | T+1 and T+0 future state process definitions | | | | |
| 2.6 | Refine project scope and work plan | adjusted project scope and work plan | | | | |
| 3. | Establish Process and Technology Baseline | | | | | |
| 3.1 | Gather FTE and Level of Automation Data | FTE data | | | | |
| 3.1.1 | Gather FTE data | | | | | |
| 3.1.2 | Gather Core Automation Data | LOA data for core systems | | | | |
| 3.1.3 | Gather Non-Core Automation Data | LOA data for non-core systems | | | | |
| 3.2 | Gather Volume Data | volume data | | | | |
| 3.3 | Analyze FTE/Automation Data | | | | | |
| 3.4 | Review Process Fragmentation Report | | | | | |
| 3.5 | Analyze Impact of Changing Business Volume | | | | | |
| 3.5.1 | Effects by Business Process | | | | | |
| 3.5.2 | Effects by Competency | | | | | |
| 3.6 | Compile and Review Critical Issues | updated STP issue log | | | | |

FIG._5A

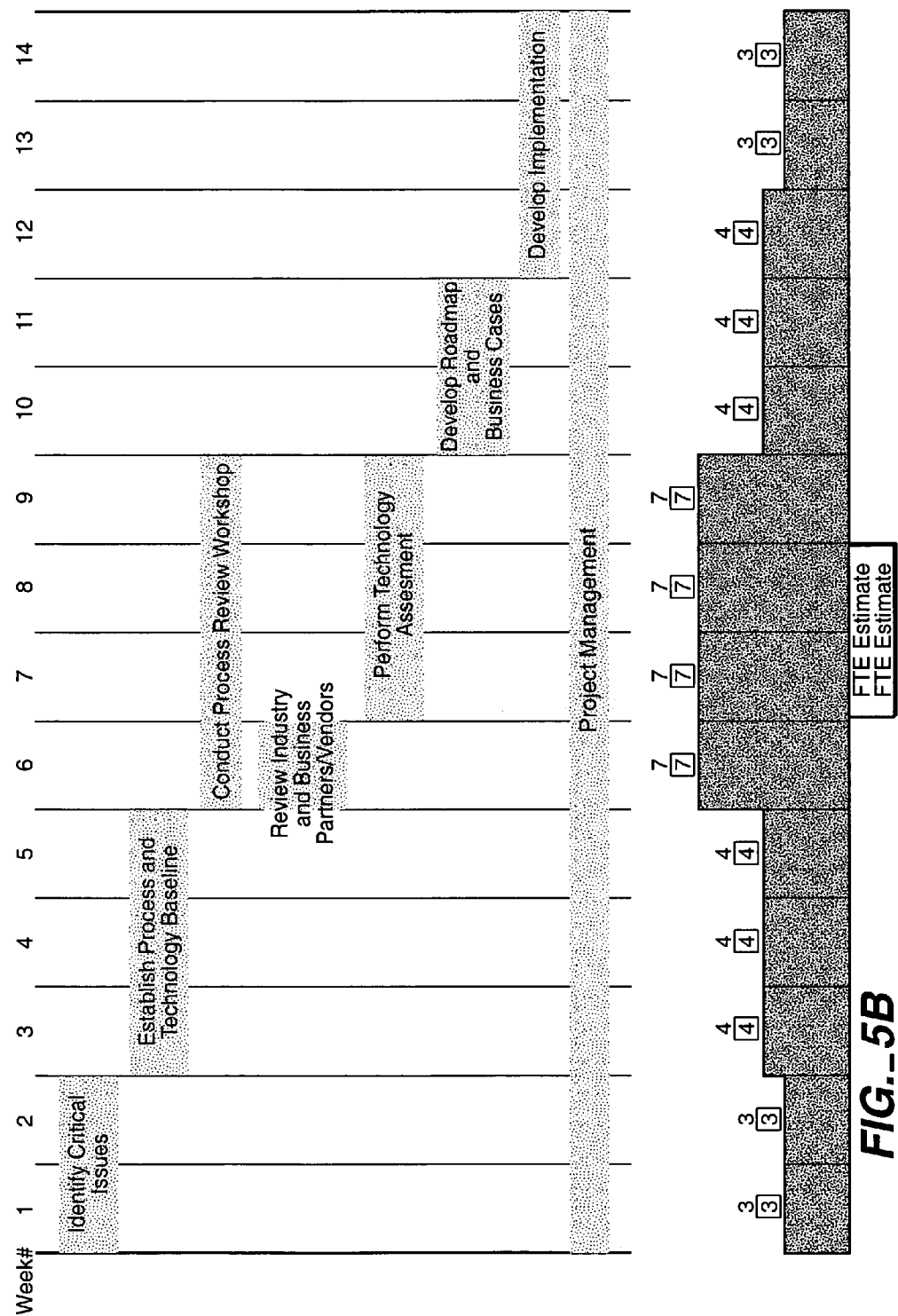
FIG._5B

Interview Notes

| Category/Question | Comments |
|---|---|
| General | |
| 1. What are your firm's key business strategies and goals? | |
| 2. What are the key markets your firm is currently targeting, or is planning to target, in the future? | |
| 3. What are the key products your firm is currently offering, or is planning to offer in the future? | |
| 4. How does eCommerce figure into your strategies? | |
| 5. What key capabilities do you think your firm needs for continued success? | |
| 6. What important capability gaps, if any, do you currently have? | |
| 7. Where do you see growth in your business? What is your forecast of the future growth rate in these areas? What impact will the growth have on your operation? | |
| 8. What important operational problems or bottlenecks do you see in your firm? | |
| 9. What are the areas of greatest operational risk?; cost? | |
| 10. Are there any key operational quality issues? | |
| STP Related | |
| 11. What is your definition (vision) of STP? | |
| 12. What is the level of concern you have regarding your firm's ability to adapt to T+1; T+0? | |
| 13. What benefits, if any, do you see in achieving STP? | |
| 14. Which area of your firm has the greatest distance to go in achieving STP? | |
| 15. What area of your firm should be addressed first in building an STP capability? | |
| 16. What do you see as the major obstacles in achieving STP in your firm? | |
| What are your firm's annual custodian and DTC charges? | |

FIG._6

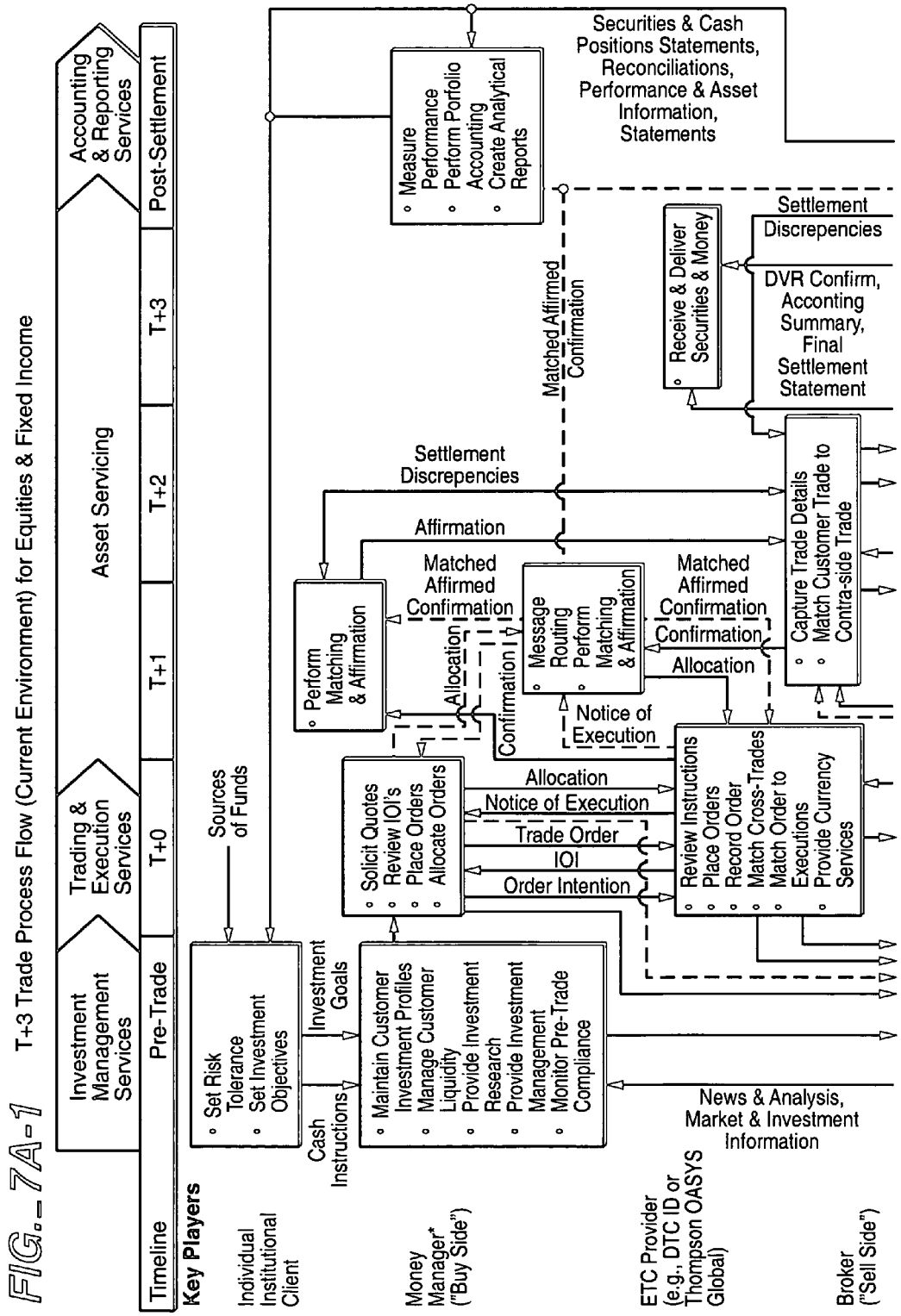
FIG._7A-1  T+3 Trade Process Flow (Current Environment) for Equities & Fixed Income

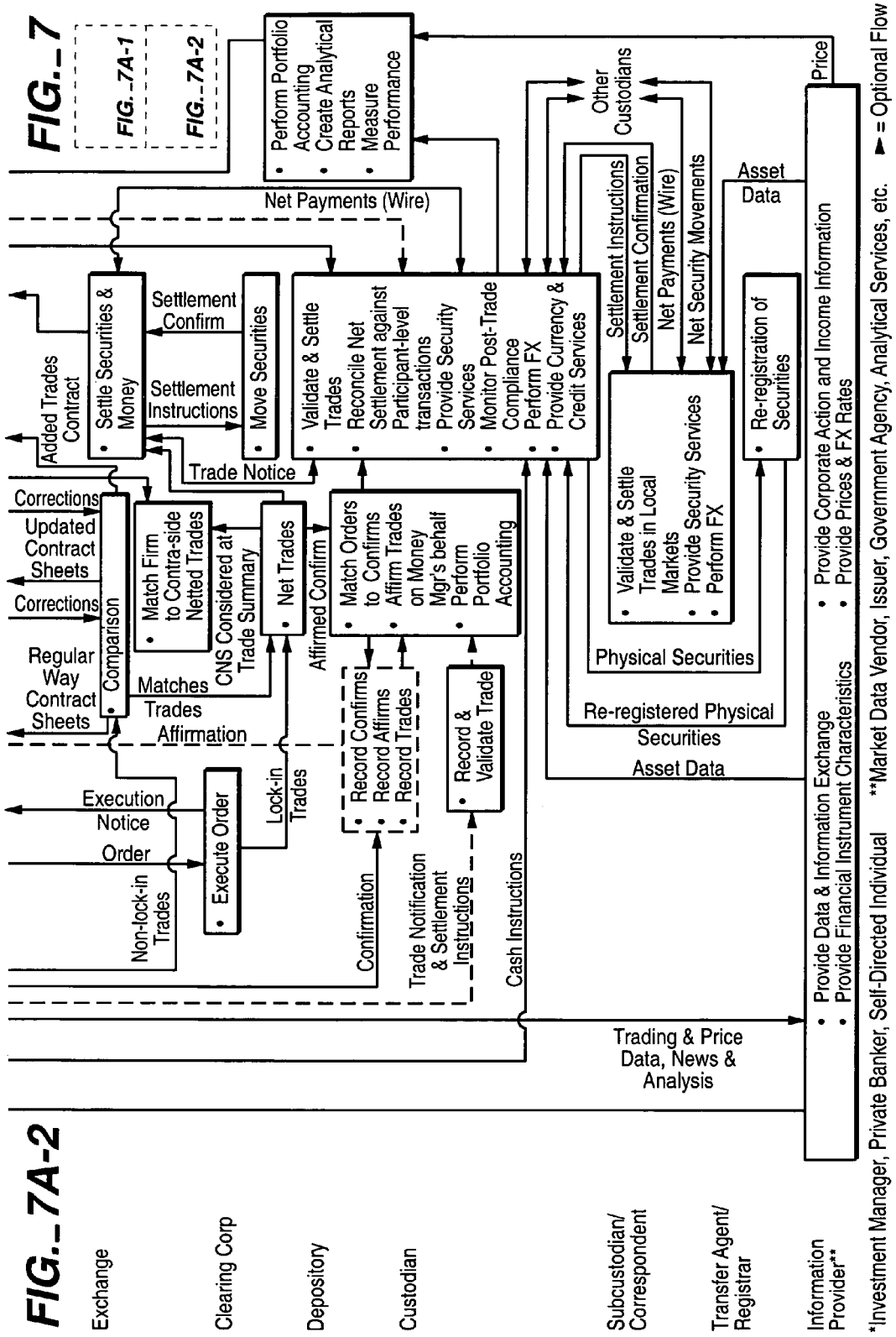

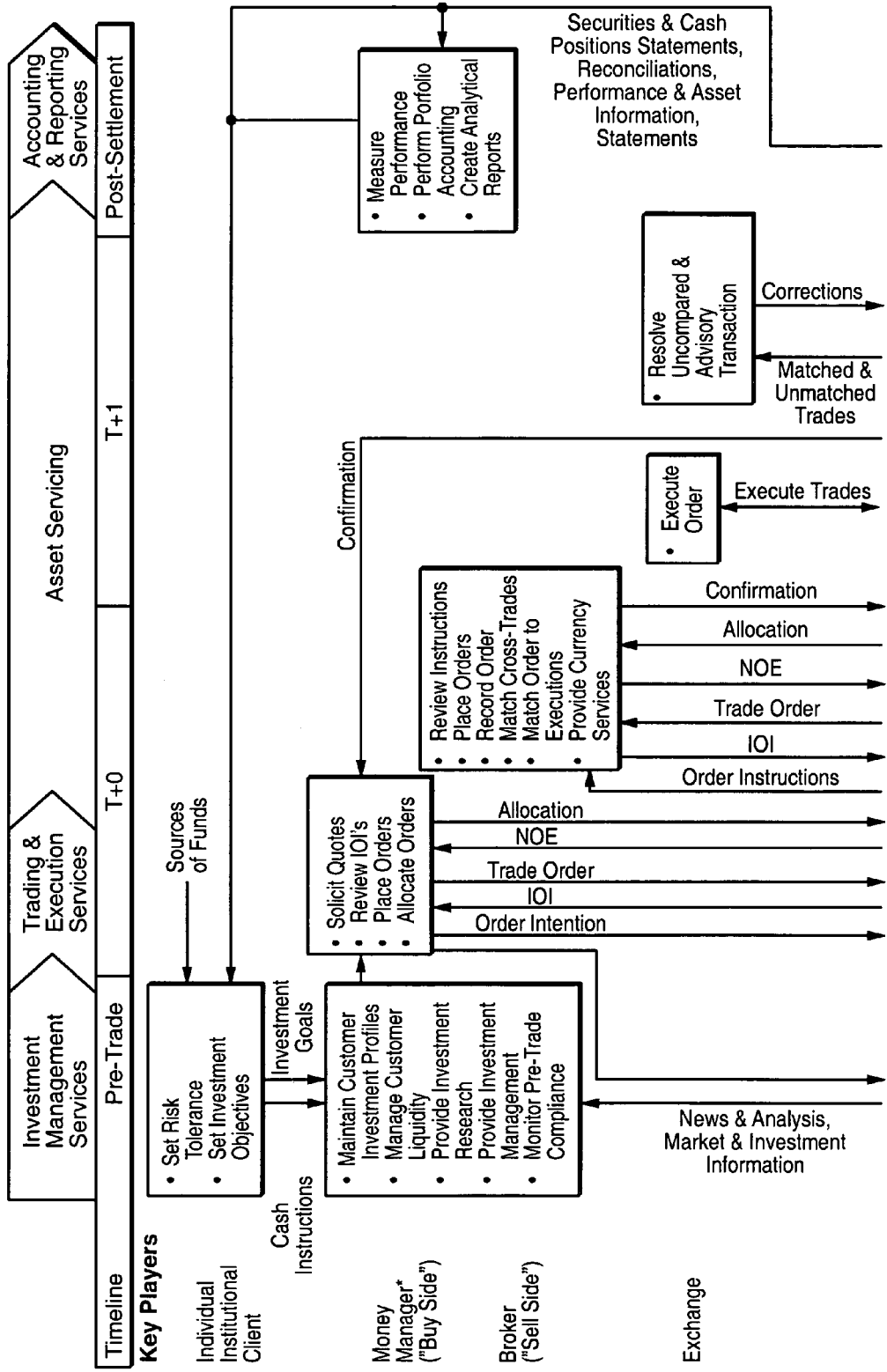
FIG._7B-1   T+1 Trade Process Flow for Equities & Fixed Income Using a Thin Industry Utility

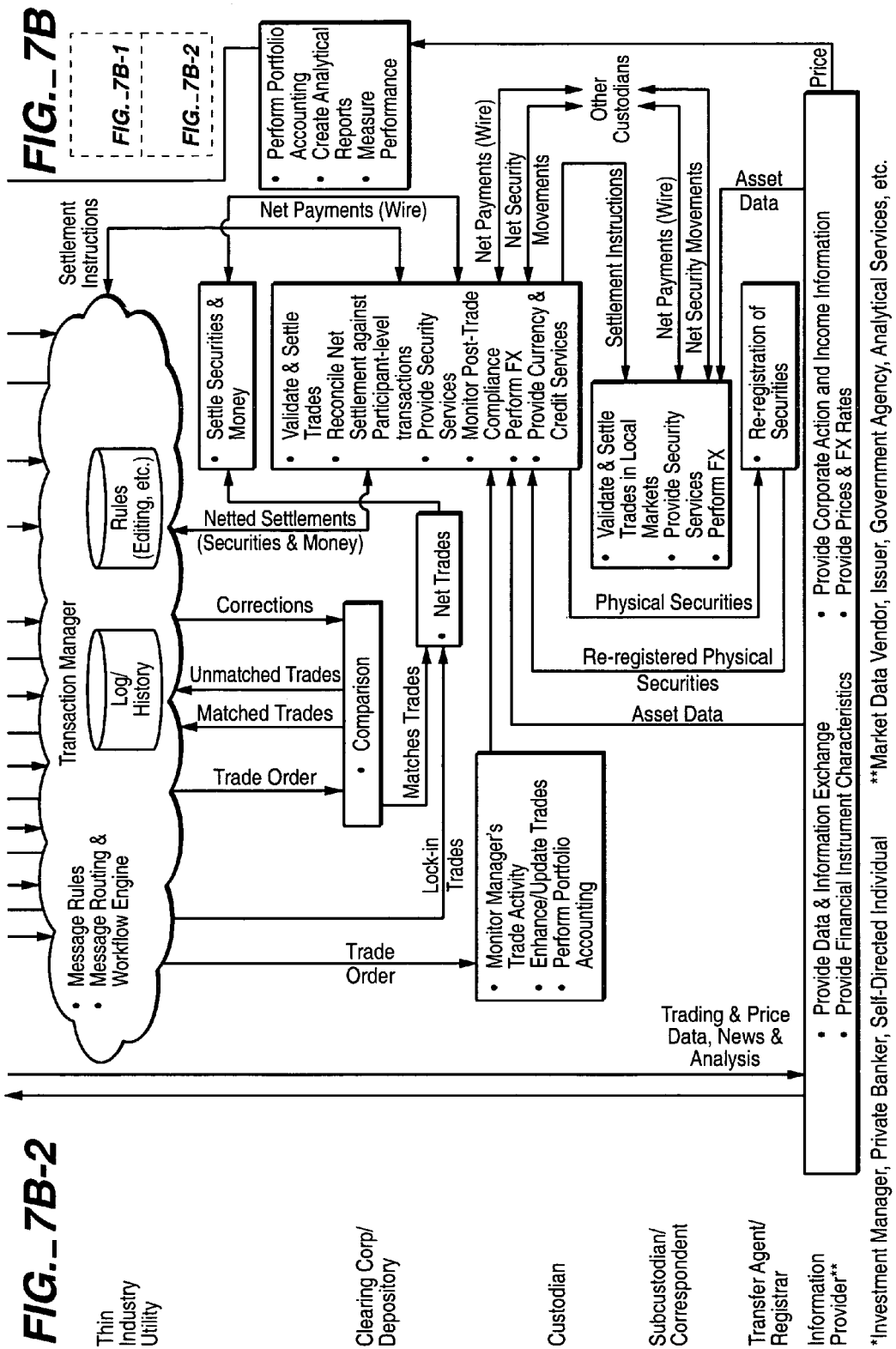

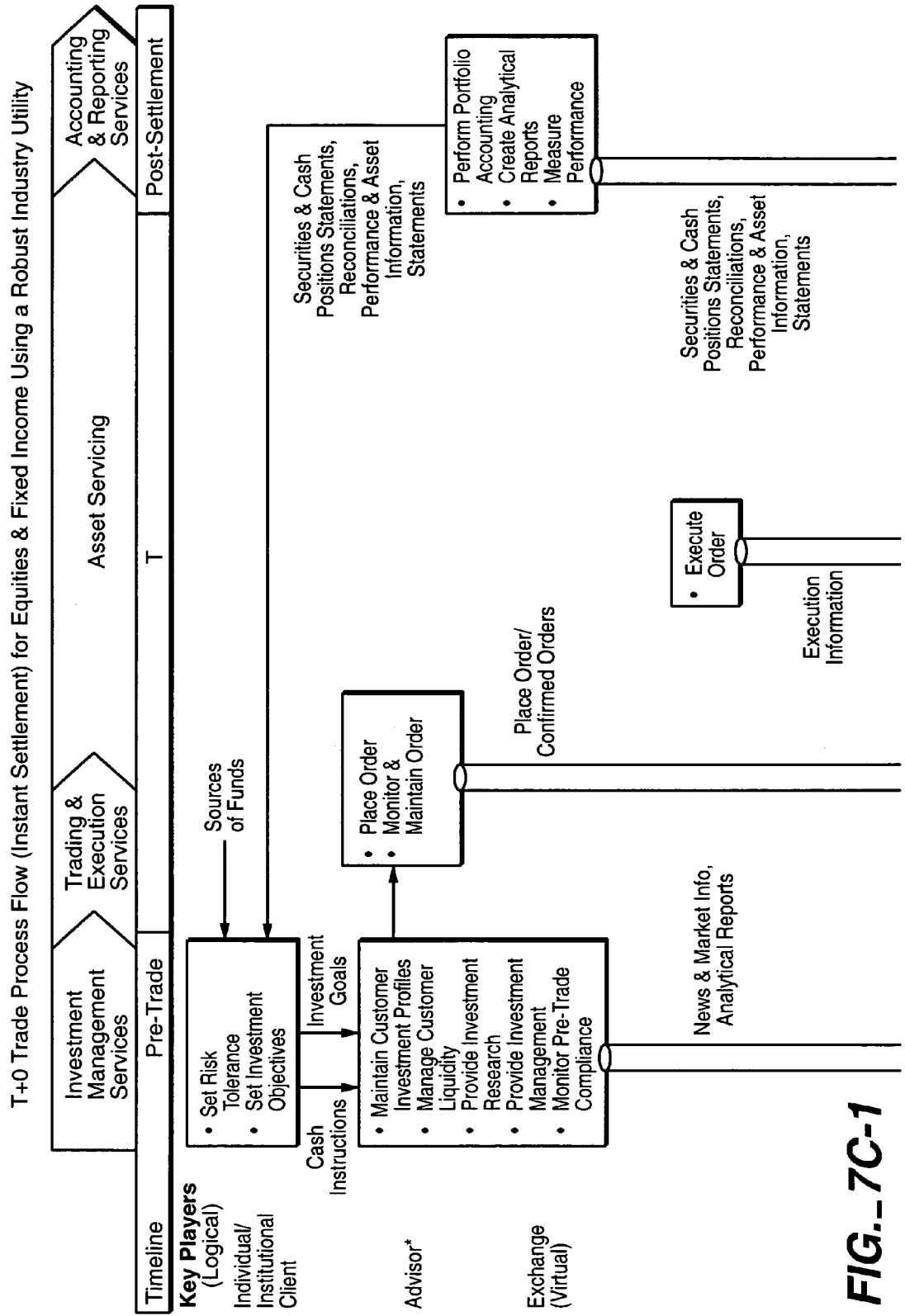
FIG._7C-1

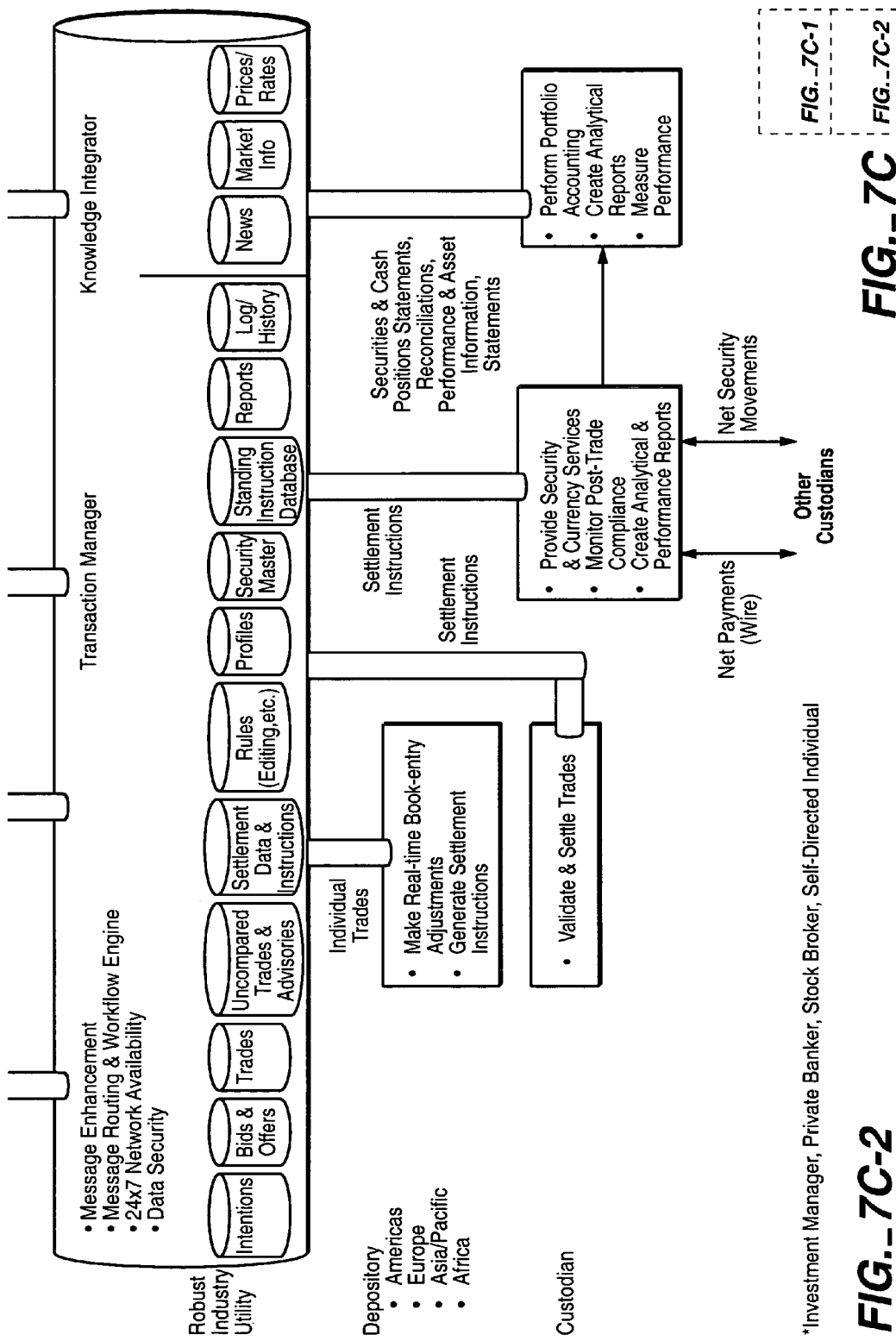

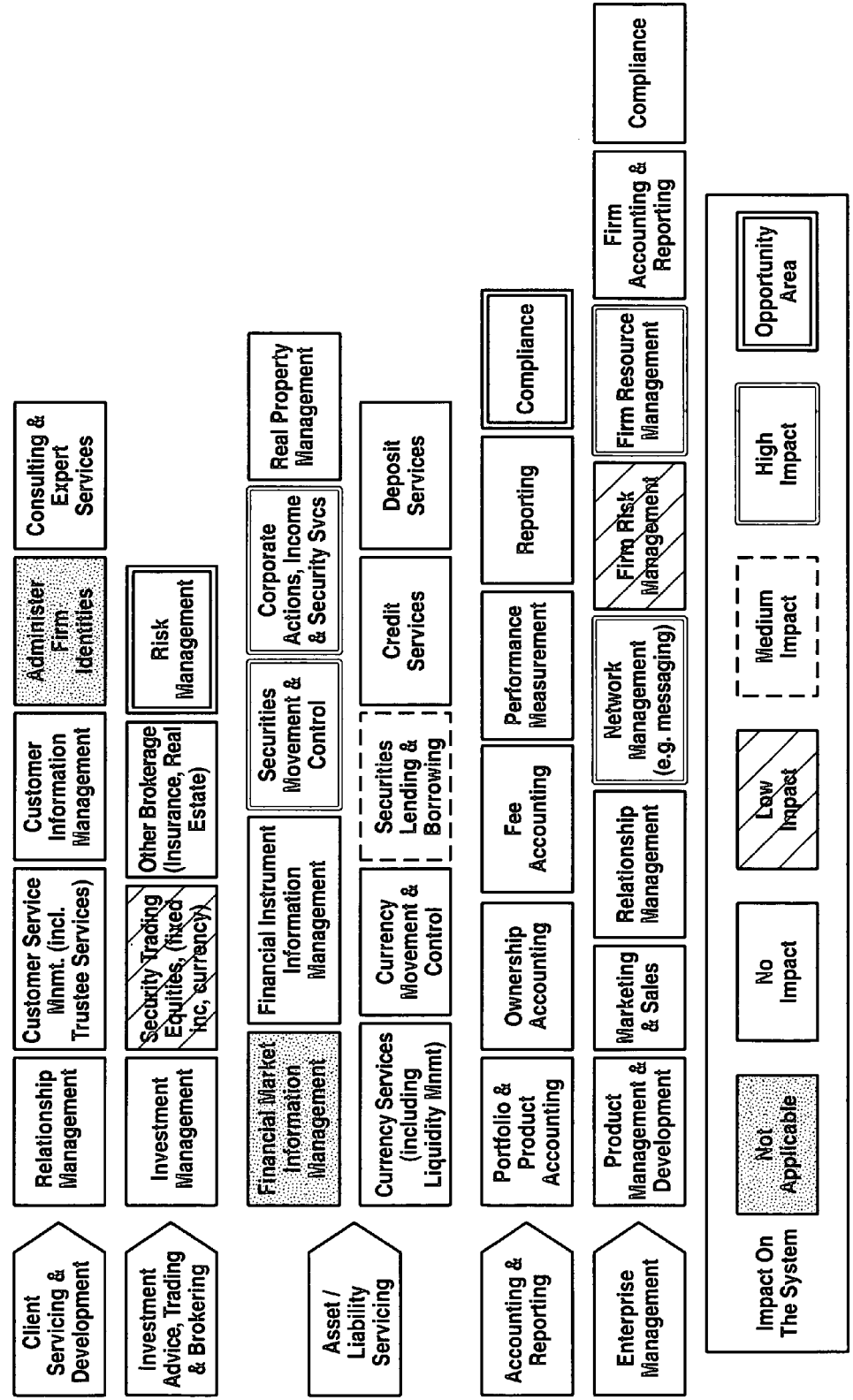

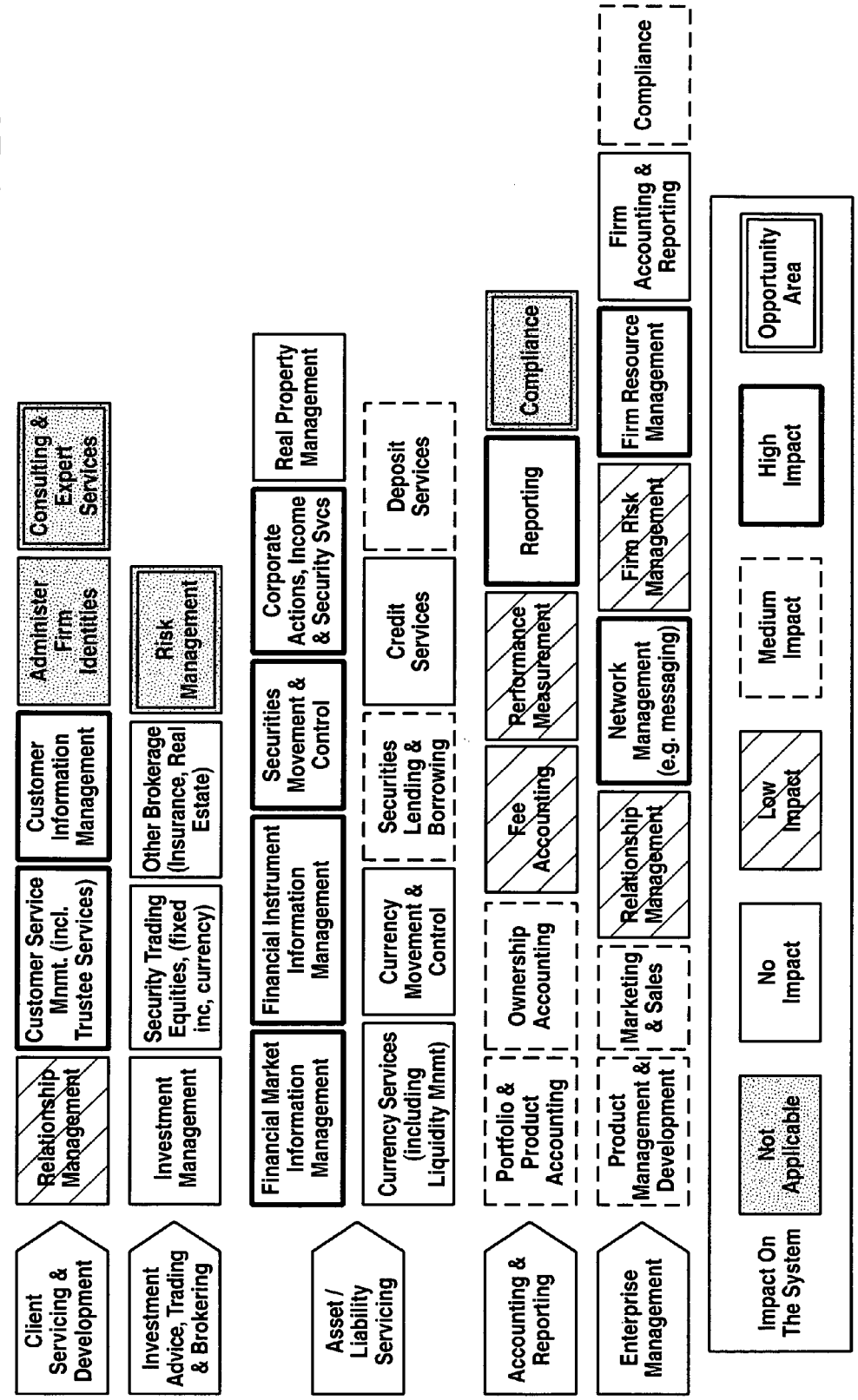
FIG._8B

Business Partner and Vendor Interview Guide

| Question | Comments |
|---|---|
| 1. How would you characterize your company's role in the securities industry?<br><br>2. How do you view your company's relationship with our organization?<br><br>3. What is your definition (vision) of STP?<br><br>4. How would you assess your company's STP readiness (L/M/H)? Why?<br><br>5. What are major STP-related initiatives planned or underway in your company?<br><br>6. What is the level of concern you have regarding your firm's ability to adapt to T+1; T+0?<br><br>7. Which area of your firm has the greatest distance to go in achieving STP-related gains?<br><br>8. What area of your company should be addressed first in building an STP capability?<br><br>9. What do you see as the major obstacles in achieving STP in your company?<br><br>10. As regards your STP efforts, to what degree is management's focus on each competency area (people, process and technology)? (L/M/H) | |

| Roles in Company the Industry | Relationship with your Organization (e.g., Business Partner, or Vendor) | Overall STP Readiness (L/M/H) | Management Focus (L/M/H) | | | | Organization(e.g., process affected) | Impact on your organization's STP Readiness |
|---|---|---|---|---|---|---|---|---|
| | | | Technology | Process | People | Comments | | |
| | | | | | | | | |
| | | | | | | | | |
| | | | | | | | | |
| | | | | | | | | |
| | | | | | | | | |

FIG. 12 (1200, 1210)

| Application | Functional Assessment (H/M/L) | | | | | Technical Assessment (H/M/L) | | | | | | Party |
|---|---|---|---|---|---|---|---|---|---|---|---|---|
| | Support Current Business Needs | Support Future STP Changes | Timely & Accurate Information | Reliability & Availability | w/Other Applications | Quality | Easy to Support | Easy to Integrate | Standards | Easy to Enhance | Scaleable | Technical Quality | Comments | Solutions |
| | | | | | | | | | | | | |
| | | | | | | | | | | | | |
| | | | | | | | | | | | | |
| | | | | | | | | | | | | |
| | | | | | | | | | | | | |

FIG._11

| Business Process/Activity | | Relevant Core, Non-core Applications |
|---|---|---|
| 93 | CLIENT SERVICING AND DEVELOPMENT | |
| | Relationship Management | |
| 93.01 | Establish and Monitor Service Tiering Alignment | Fees, Ticklers, Account Options |
| 93.02 | Establish and Manage Client Service Teams | |
| 93.03 | Maintain Client Communications | Statement messages, Ticklers |
| 93.04 | Monitor Client Service Team Performance | |
| 93.05 | Monitor Counterparty Service Performance | |
| 10 | Customer Service and Information Management | |
| 10.01 | Set up New Client/Counterparty Relationships | Client Maintenance (within T3K) |
| 10.05 | Establish Client/Counterparty Accounts | Client Maintenance (within T3K) |
| 10.03 | Establish and Maintain Client Service Profile | Client Maintenance (within T3K) |
| 10.08 | Fulfill Fiduciary Obligations | N/A |
| 10.09 | Fulfill Obligations as Agent | N/A |
| 10.04 | Maintain Client/Counterparty Communications | N/A |
| 10.06 | Maintain Account Profile Information | Client Maintenance (within T3K) |
| 10.02 | Establish and Maintain Client/Counterparty | Client Maintenance (within T3K) |
| 10.07 | Maintain Account Investment Information | Client Maintenance (within T3K) |
| 60 | Administer Trust Indentures | |
| 60.01 | Negotiate Indenture | |
| 60.02 | Qualify Trustee to Act | Account Setup & Reporting |
| 60.03 | Authenticate and Issue Securities | |
| 60.04 | Monitor Terms of Indenture | |
| 30 | Consulting and Expert Services | |
| 30.01 | Provide Issuer Related Advice | |
| 30.02 | Provide Investor Related Advice | |
| 30.03 | Provide Research Information | |
| 30.04 | Provide Risk Management Advice | |

| Category | Description of Current Environment | Changes Required to Support STP | Key Dependencies for Changes | Estimated Effort Required for Change (H/M/L) | Possible Third-party Solutions |
|---|---|---|---|---|---|
| Data Architecture | | | | | |
| Computing Environment | | | | | |
| Network Environment | | | | | |
| Infrastructure Environment | | | | | |

| Idea No. | Improvement Idea Description | Priority (H/M/L) | Quick Hit (?) | Timing | Process Affected | Application Affected | Estimated Programming Hours | Third-party Involved | Dependency |
|---|---|---|---|---|---|---|---|---|---|
| | | | | | | | | | |
| | | | | | | | | | |
| | | | | | | | | | |
| | | | | | | | | | |
| | | | | | | | | | |

| Project No. | Project Name | Scope/Functionality Delivered | Approach | Deliverables | Timing | Resource | Interdependencies |
|---|---|---|---|---|---|---|---|
| | | | | | | | |
| | | | | | | | |
| | | | | | | | |
| | | | | | | | |
| | | | | | | | |

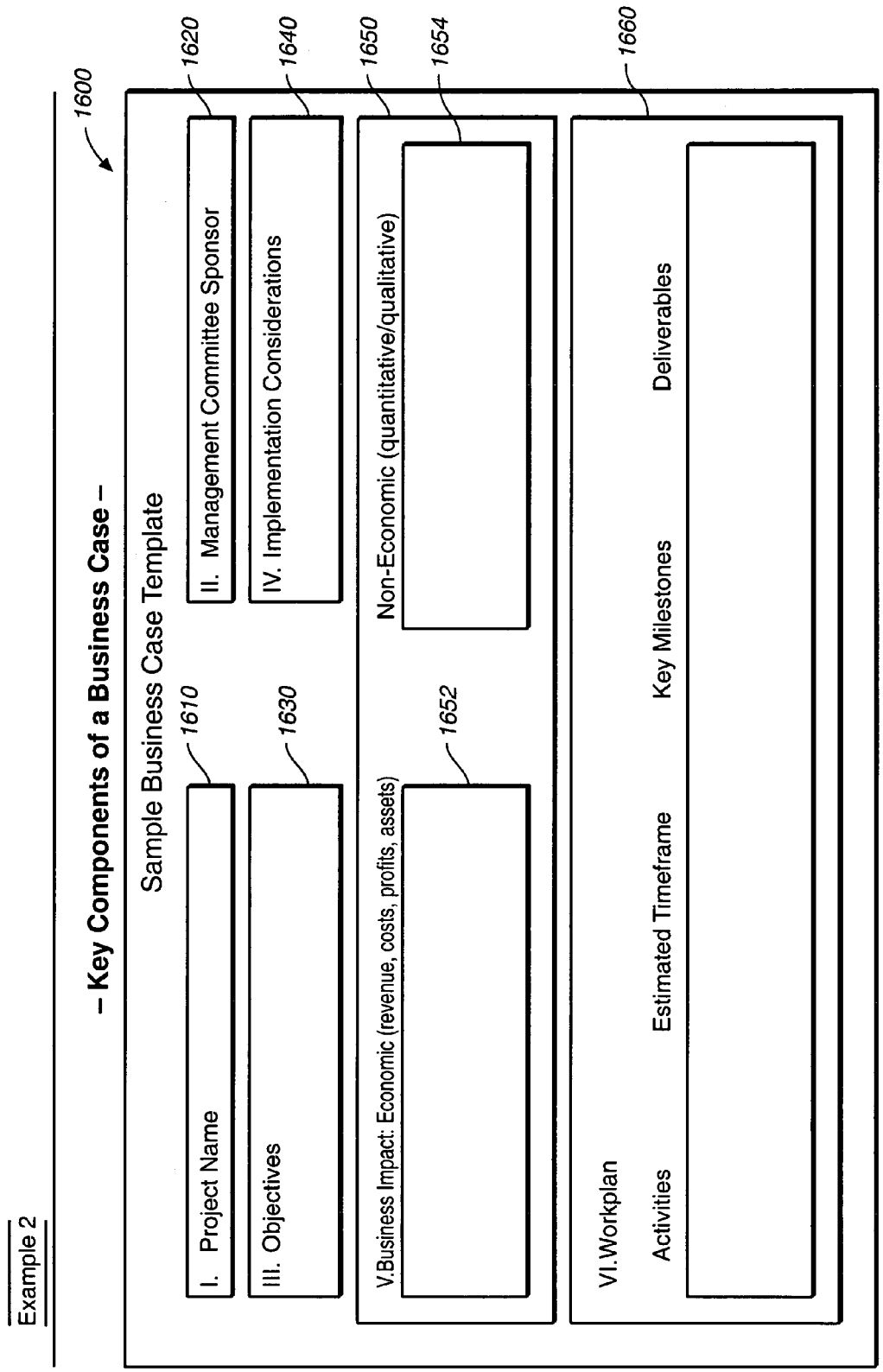
FIG._17

METHOD AND SYSTEM FOR IDENTIFYING BOTTLENECKS IN A SECURITIES PROCESSING SYSTEM

CROSS-REFERENCE TO RELATED APPLICATIONS

This Patent Application is related to U.S. patent application Ser. No. 09/592,048, filed Jun. 12, 2000, entitled "A Method and System for Web Based Straight Through Processing ", the contents of which are incorporated herein by reference.

TECHNICAL FIELD

This invention relates to the field of computers, telecommunications and Internet based systems. More particularly, the present invention relates to a method and system for identifying bottlenecks in securities processing operations and systems.

BACKGROUND ART

Straight-through processing (STP) is an integrated approach to achieve hands-off, end-to-end processing of securities transactions without manual intervention or redundant handling. STP has been a goal of the securities industry for years, but a sense of urgency to achieve STP has been brought about by a convergence of changes in a rapidly evolving financial marketplace. These changes include: increased cross-border trades, extended trading hours, decimalization of securities prices, the Securities and Exchange Commission (SEC)'s "hovering mandate" requiring T+1 (trade date plus one day) settlement of domestic equities by mid-2002, and the general pressure to meet rising customer expectations of speed and value in the Internet economy.

The rapid changes in the securities industry have a variety of implications, ranging from an explosion in transaction volumes to increased operational speed and complexity. However, a common denominator is compressed time frames, as manifested in shorter settlement cycles and the demand for real-time information. The increasing speeds at which transactions take place has significant implications for the industry as a whole and for individual players in the marketplace.

Current automated systems which connect financial market players (i.e. investment managers, broker-dealers, banks, financial instrument depository organizations, and infrastructure service providers), currently require three days (T+3) to clear a transaction (that is, have the money change hands and stock ownership records changed). The underlying computer and telecommunications systems infrastructure at each of the major players is complicated by such factors as each player's accounting system (needed to provide legally required records and to support payment of the players for their efforts), by complex "authorization & verification" protocols (between the computer systems of the various players), and by the many manual processes and legacy hardware and software in use. Such systems cannot be easily modified to accommodate a one day closing (T+1) process. As explained in more detail below, the exponential growth in the trading volumes in the U.S. stock markets in terms of shares traded and money involved (fueled in large part by the growth of the Internet, 24 hour trading capability, etc.) have created such a staggering amount of money (float) attendant to the three days clearance process, that the Securities & Exchange Commission has encouraged the creation of a one day clearance cycle (T+1) in order to minimize this float with the recommendation that this process be implemented by June 2002. While this is not deemed to be a firm date it is a target proposed by the SEC and various consortia of trading members, such as the Securities Industry Association (SIA), Industry Standardization for Institutional Trade Communications (ISITC), and other industry groups are attempting to define and build systems to be in place by this date.

The current T+3 clearance process may be visualized with reference to FIG. 2 wherein is shown an exemplary depiction of the processes in the lifecycle of a customer buy-trade of either domestic securities or corporate/municipal bonds initiated and settled in the U.S. domestic market. The assumptions are that all trading is in block form, all securities are immobilized in the depository and all trades are for institutional clients. This Figure is taken from the Securities Industry Association (SIA) White Paper version 1.5, Dec. 1, 1999, entitled "Institutional Transaction Processing Committee" (hereinafter "SIA White Paper"), which is incorporated fully herein by reference. In FIG. 2 an investment manager places an order 201 with a broker-dealer who places an execution request 203 with an exchange. The exchange returns a trade order confirmation 205 to the broker-dealer who calculates the Notice of Execution (NOE) and average price 207 and sends the NOE 209 to the investment manager. The investment manager matches the NOE with the original order 211 and allocates shares among client accounts 213. He then forwards the allocation details 214 to the broker-dealer directing the broker-dealer to allocate the trade among different accounts, and sends a trade notification 215 to the custodian. The investment manager then generates settlement & delivery instructions 217 and passes these 219 to the broker-dealer. The broker-dealer enriches the trade details with settlement instructions, fees, commissions, and tax 221 and generates messages to confirm the trade 223. The broker-dealer sends the trade detail message 225 to the depository who creates a confirmation 227 and sends the confirm message 229 to the investment manager The investment manager matches the confirm data from the depository to his previous allocations 231 and assuming they match he sends an affirm message 233 back to the depository. The Depository sends affirmed confirm messages to the broker dealer 237 and to the custodian 238 and the broker-dealer completes a settlement authorization 240 and returns it 239 to the depository who executes his part of the settlement 241 and notifies the custodian of the settlement 243 and the custodian completes the settlement 245.

Because of the enormous volume of trading activity and the number of interrelated parties involved in a trade, securities firms do not compare and clear trades among themselves. Most transactions are passed over to clearing corporations and depositories that compare and clear the trades. Clearing refers to the processing of payment instructions, and settlement refers to the actual exchange of funds and securities between parties. In the U.S., there are several clearing houses that serve various markets. Trading on the New York Stock Exchange (NYSE), Amex, NASDAQ and some regional exchanges are cleared and settled through the National Securities Clearing Corporation (NSCC); U.S. Treasuries are handled by the Government Securities Clearing Corporation (GSCC). In the options markets, the Options Clearing Corporation (OCC) clears trades for the Chicago Board Options Exchange (CBOE), as well as for the options traded on the NYSE, AMEX, and the Pacific Stock Exchange.

At the present time most of these market players need several days to handle trade/settlement activities. Much of the processing is done by overnight batch processing methods using various computer systems, and each with their own standards, formats, and methodologies. Communications are predominantly single-threaded, point-to-point with a manual focus. And some of the processes are manual processes. In the cross-border trading area there is limited automation, and the clearance process has high failure rates due to limited expertise in foreign market trading and non-dollar instrument handling. Accordingly, there is a technical problem set related to transforming this T+3 process to a T+1 process for clearance of security trades.

Incremental change will not allow the securities industry to adapt. T+1 trade settlement is expected to be a precursor to T+0 settlement. Successful adaptation to the new environment will require structural change. A degree of collaboration must be achieved which allows for STP among players, similar to that found in the payments industry.

Due to the compressed time frames of the industry's STP mandate as well as the rapid pace of technological and marketplace change, there exists a need to phase in significant changes quickly and allocate resources to address the most time critical issues first. Thus, a system and method is needed to evaluate the immediate impact of integrating straight through processing techniques to effect T+1 settlement of domestic equities in a securities processing system. A system and method is also needed to evaluate the longer term impact to a securities processing system presented by T+0 settlement and emerging electronic commerce related business practices.

T+1 evaluation uses a narrower, and more urgent, set of criteria to judge the impact of STP on a securities processing system. T+1 impact is defined as the challenges presented by meeting the more compressed time frames imposed by T+1 settlement of domestic equities. Challenges include the need to support open data standards as defined possibly by the GSTPA and the need to meet shorter settlement cycles. T+0 evaluation, on the other hand, uses a broader, longer term set of criteria to evaluate the impact of STP on a securities processing system. T+0 impact is characterized by not only same day settlement of securities, but also by the broader need for a securities processing system to become an end-to-end electronic commerce enabled enterprise, with Straight Through Processing beginning and ending with the investor or end customer.

The implication is that short term solutions to the T+1 challenge must be engineered to support a longer-term transition to an STP-enabled securities processing system fully connected in the electronic commerce arena, and able to support T+0 settlement. New organizations and systems must be designed that can eventually support same day settlement and dynamic, on-line interaction with customers and business partners. Thus, a system and method of identifying technological and methodological bottlenecks in a securities processing system is needed. In particular, identification of these technological and process inefficiencies may be accomplished through implementation of a system and method for assessing the ability of a securities processing system to apply straight through processing to securities transactions.

BRIEF SUMMARY OF THE INVENTION

A system and method of assessing the ability of a securities processing system to implement automated processing of securities asset management functions within the securities processing system are disclosed. A diagnostic methodology is presented wherein a user may use the system and method of the present invention to identify gaps in the ability of a securities processing system to implement automated processing of securities management functions and to gather information and data in order to develop an implementation plan to remediate the identified gaps. A computer-implemented, menu-driven application provides flow control and data management resources for managing a plurality of activities of assessing the ability of a securities processing system to apply straight through processing to securities transactions. Critical issues in implementing the automated processing of securities management functions in the securities processing system are identified and captured on electronic documents. Process and technology performance information for the current state of the securities processing system is captured using computer-implemented templates to record human resource utilization, level of automation, and volume data across a set of processes defined within the business and technology environments. This current process and technology performance information is analyzed with respect to a desired future state for the securities processing system implementing automated processing of securities management functions and scored. Information is also gathered regarding systems external to and connected to the securities processing system, such as business partner systems, vendor systems, and the industry-wide system. The ability of these external systems to implement automated processing of securities asset management functions is evaluated, and their potential impact on the securities processing system is assessed. Recommendations for improving process and technology performance for the securities processing system are formulated and prioritized. Tasks associated with the prioritized recommendations are defined and included in an implementation plan. Progress on the tasks of the straight through processing implementation plan are assessed and monitored on an ongoing basis.

One implementation of the present invention comprises a menu-driven navigation and data tool implemented using a commercially packaged applications software product integrating a relational database program, a word processing program, a spreadsheet program, a presentation generation program, and electronic documents created using these programs. The steps of the assessment process are set forth in a series of menus creating using forms within the relational database program. The key steps of the assessment methodology are shown in the initial menu of the data tool and each key step includes a hyperlink to a submenu. The submenu includes substeps for the key step from which the submenu is accessed. Each substep within each submenu may further contain a hyperlink to open a document containing guidelines and instructions for the substep from which the document is accessed. Alternatively, the substeps may be hyperlinked to additional menus breaking down the substeps into further substeps. The steps and substeps of the assessment process may further be associated with command buttons for hyperlinking into templates and data files, and for implementing data from the data files into the relational database program for report generation.

BRIEF DESCRIPTION OF THE DRAWINGS

FIG. 1 is a flow chart illustrating eight steps of the computer-assisted diagnostic methodology for assessing the ability of a securities processing system to implement automated processing of securities management functions of the system and method of the present invention;

FIG. 2 is a flow chart illustrating the representative current message flow in a T+3 system entitled "Illustrative Institutional DVP Trade Process";

FIG. 3 is a diagram illustrating the selections available in the opening navigation screen used in one embodiment of the present invention;

FIG. 4A illustrates an example of a screen display used in one embodiment of the present invention for the "Project Management" step shown in FIG. 1;

FIG. 4B illustrates an example of a screen display used in one embodiment of the present invention for the "Identify Critical Issues" step shown in FIG. 1;

FIG. 4C illustrates an example of a screen display used in one embodiment of the present invention for the "Establish Process and Technology Baseline" step shown in FIG. 1;

FIG. 4D illustrates an example of a screen display used in one embodiment of the present invention for the "Conduct Process Review Workshops" step shown in FIG. 1;

FIG. 4E illustrates an example of a screen display used in one embodiment of the present invention for the "Review Industry, Business Partners', and Vendors' STP Initiatives" step shown in FIG. 1;

FIG. 4F illustrates an example of a screen display used in one embodiment of the present invention for the "Perform Technology Assessment" step shown in FIG. 1;

FIG. 4G illustrates an example of a screen display used in one embodiment of the present invention for the "Develop Roadmap and Business Case" step shown in FIG. 1;

FIG. 4H illustrates an example of a screen display used in one embodiment of the present invention for the "Develop Implementation Plan" step shown in FIG. 1;

FIG. 5A illustrates an example of a workplan used in one embodiment of the present invention;

FIG. 5B illustrates an example of a project timeline generated using the example workplan shown in FIG. 5A;

FIG. 5C illustrates an example of a team composition guidelines chart generated using the example workplan shown in FIG. 5A;

FIG. 6 illustrates an example of a guide for interviewing internal executives used in one embodiment of the present invention;

FIGS. 7A-1 and 7A-2 illustrate an example of a trade process flow diagram for the current environment used in one embodiment of the present invention.

FIGS. 7B-1 and 7B-2 illustrate an example of a trade process flow diagram for the T+1 environment used in one embodiment of the present invention.

FIGS. 7C-1 and 7C-2 illustrate an example of a trade process flow diagram for the T+0 environment used in one embodiment of the present invention.

FIG. 8A illustrates an example of a T+1 impact heat map used in one embodiment of the present invention;

FIG. 8B illustrates an example of a T+0 impact heat map used in one embodiment of the present invention;

FIG. 9 illustrates an example of a guide for interviewing external business partners and vendors used in one embodiment of the present invention;

FIG. 10 illustrates an example of a template used in one embodiment of the present invention for documenting the STP readiness of business partners and vendors;

FIG. 11 illustrates an example of a process/application map used in one embodiment of the present invention;

FIG. 12 illustrates an example of a template used in one embodiment of the present invention for documenting the functional and technical assessment of applications used in the securities processing system;

FIG. 13 illustrates an example of a template used in one embodiment of the present invention for assessing the information technology infrastructure of the securities processing system;

FIG. 14 illustrates an example of a template used in one embodiment of the present invention for documenting potential process and technology improvement opportunities within the securities processing system;

FIG. 15 illustrates an example of a template used in one embodiment of the present invention for defining projects;

FIG. 17 illustrates an example of a template used in one embodiment of the present invention for defining a business case.

DETAILED DESCRIPTION OF THE PRESENTLY PREFERRED EMBODIMENTS

Figure 16:
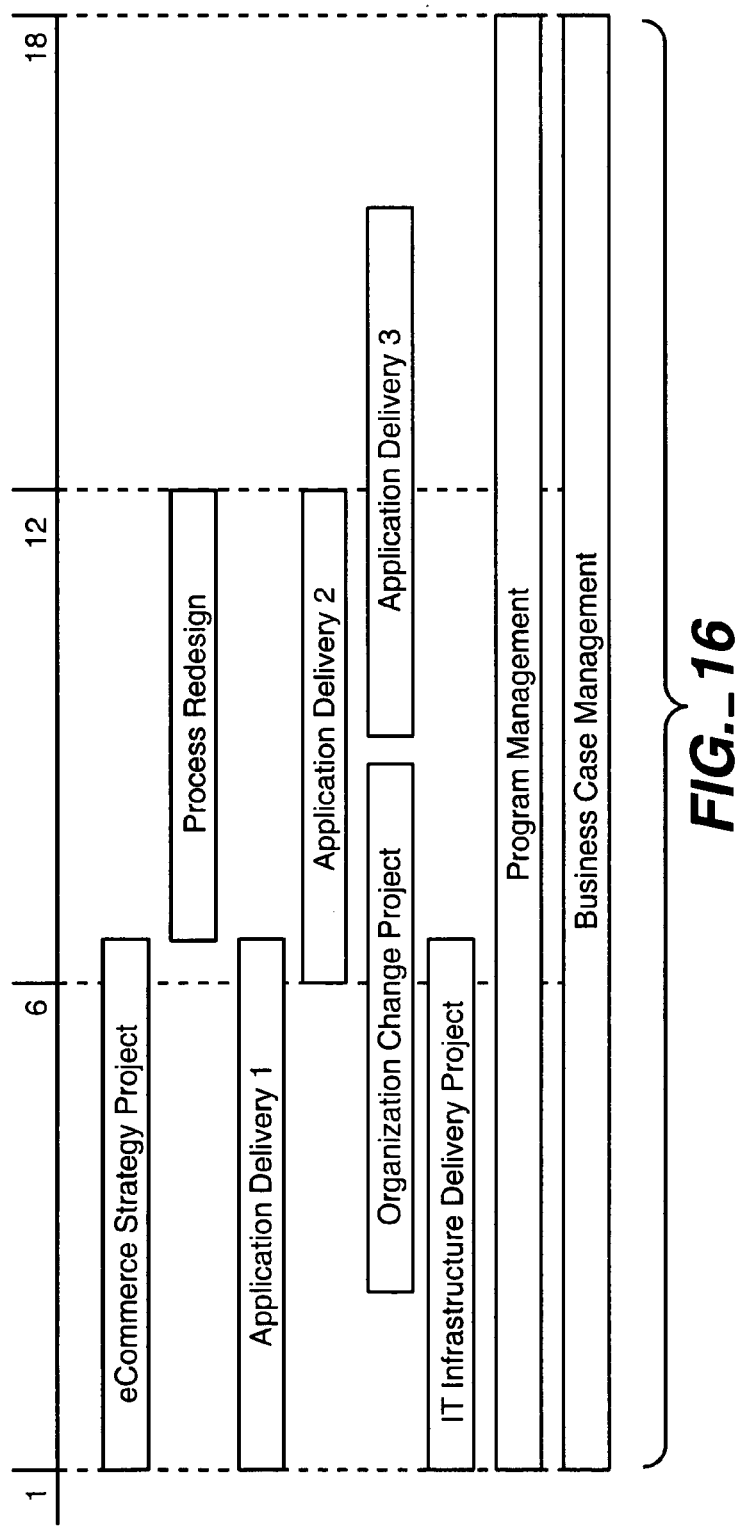
FIG. 16 illustrates an example of a roadmap for achieving straight through processing used in one embodiment of the present invention.

Methods and systems for identifying bottlenecks in a securities processing system by assessing the ability of a securities processing system to apply straight through processing to securities transactions are disclosed. The following description is presented to enable any person skilled in the art to make and use the invention. Descriptions of specific applications are provided only as examples. Various modifications of the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

In a preferred embodiment of the present invention, a diagnostic methodology for assessing the readiness of a securities processing system for performing straight through processing on securities transactions comprises executable code running on a general purpose computer such as a conventional PC. Alternatively, the executable code may run on a server and be accessible through a client computer accessing the executable code from a remote location through a local area network such as an Ethernet, a wide area network, or the Internet, using standard communications protocols.

Preferably, the executable code comprises commercially available applications software products including a database program, a word processing program, a spreadsheet program, and a presentation generation program, and related template and form data files creatable, viewable, modifiable, and executable within the various commercially available applications software products. In one embodiment of the present invention, executable code included in the applications software products enables data from files created using one of the applications software products, such as the spreadsheet program, to be imported into another of the applications software products, such as the database program. Furthermore, in one embodiment of the present invention, source code expressed in the Visual BASIC programming language may be used to enable data files created and modifiable using one applications software product to be used in cooperation with other applications software products. In one embodiment of the present invention, the commercially packaged applications software products preferably include Microsoft Access 97, Microsoft Word 97, Microsoft Excel 97, and Microsoft Power Point 97. Alternatively, source code written in other programming languages or other versions of a database program, a spreadsheet program, a word processing program, and a presentation generation program running on a general purpose computer may be used.

Preferably, the diagnostic program begins executing by running under a commercial database application for personal computers such as Microsoft Access 97. The diagnostic program follows a menu driven outline format. The individual menu selections comprise hyperlinks to the requested information or a more detailed menu. In one embodiment of the present invention, the menu that appears after initial startup of the diagnostic program contains four options, as shown in FIG. 3: (1) review user guide 310, which can provide a hyperlink or command button to access text, graphics or multimedia documentation 315 for users, (2) review background documentation 320, which can provide a hyperlink or command button to access general background documentation 322 on straight through processing in the securities industry or, alternatively, a menu 326 linking to such documentation, (3) use data tool 330, which provides a hyperlink or command button to a process menu 100 containing the process steps 110–180 as shown in FIG. 1, and (4) exit data tool 340, which provides a command button to close the diagnostic methodology application 340 and exits the database application under which the diagnostic methodology application runs.

A diagram of the overall process for assessing the ability of a securities processing system to employ straight through processing for financial transactions is shown the process menu 100 of FIG. 1. Process menu 100 shows a diagnostic methodology wherein a user may be able to identify any gaps in a securities processing system and begin to develop an implementation plan to remediate any identified gaps. The diagnostic program begins execution in a menu driven outline format. The use of hyperlinks allows the menu to provide detailed information for each step of the process. Each of the process steps 110–180 is associated with its own self-contained window, shown in FIGS. 4A–4H respectively, which may be accessed by clicking on a hyperlink on the process menu associated with the process step for which further information is desired. Each of these windows contains a process step heading 410A–410H and several distinct subtasks. Navigation from a process step window 400A–400H back to the process menu 100 may be accomplished by clicking on a hyperlink on the process step window 400A–400H. Upon entering a process step 110–180, the objective for the step may be reviewed by clicking on the hyperlink for the process step heading 410A–410H, which will cause a text window to appear on the screen describing the objective. In addition, each subtask of a process step has a set of guidelines associated with it, and these guidelines may be reviewed by clicking on the hyperlink associated with the subtask. In addition, each subtask may also have a template or an action item, or both associated with it. Preferably, each template or action item is associated with a command button. In one embodiment of the present invention, a command button may be created using the Microsoft Access database application program. The primary purpose of a command button is to activate small programs such as macros or Visual BASIC (VBA) programs. Command buttons known in the art may be used in one embodiment of the present invention on process menu 100 and process step windows 400A–400H to activate macros, VBA programs, or other programs to perform tasks such as opening spreadsheet, word processing, presentation, or other application programs to access template files created using those programs, and other tasks such as importing data into the database application program and generating database reports.

All templates associated with the diagnostic methodology application are read-only and are password protected so that only an administrator of the diagnostic methodology application may make modification to actual templates. A template associated with a subtask may be reviewed by opening it in read only mode through clicking on the command button labeled "T" associated with the subtask as shown in the process step window. Information may be added to or updated in a template by making the adds or updates while in read only mode and then saving the updated template using the File: Save As selection on the pull down menu of the software application used to create the template. If a template has been updated, it should be used during the Action phase of the sub-task; otherwise, the standard template should be used to complete any action and saved in the same directory using File: Save As. The default directory will always be set to the directory in which the file must be saved. Furthermore, many sub-tasks have examples included within the same directory as the template. The examples have the same format and layout as the template, but are populated with sample data. The examples may be used as a guide when completing the sub-task associated with. In addition, when a document is opened via either the template or an action item button, a new instance of the software application is opened as well. Therefore, when the review of a document is complete, the document's entire application should be closed and not just the document under review.

The first step in the process, which lays the groundwork for the remainder of the STP readiness assessment, is project management step 110. The purpose of the project management step is to ensure successful management of the project and the delivery of a complete and accurate assessment of STP readiness. The first task within the project management step is to define the project objective and scope. This task may be accomplished by establishing and confirming with the project stakeholders the objectives, scope, and timing for the overall diagnostic and subsequent remedial actions and projects. The objectives and scope should then be captured for use in the development of a workplan. The second task of the project management step is to develop a communications strategy with the project stakeholders. The communications strategy should include an assessment of the type of communications each project stakeholder requires, whether it be in the form of a status-based communications approach, an issues-based communications approach, or an alternate type of communications approach. Once the appropriate communications strategy has been determined for each stakeholder, regular meeting schedules should be established with stakeholders as appropriate. Agendas for these periodic meetings may be developed from a workplan, status reports, a project issue log, or periodic project update communications. In addition, for each anticipated meeting, the objectives of the meeting and a list of the meeting participants should be documented on a communications strategy template.

Another task in the project management step of the system and method of the present invention is to establish a work plan for the STP readiness assessment. The work plan should include those activities required to complete the diagnostic and should also include expected beginning and end dates for each activity. In addition, the necessary resources for each activity should be coordinated and allocated, and should match the resources available in a staffing plan both in terms of skills and experience as well as in available man hours. Once the necessary staffing resources have been allocated, responsibility to project team members should be assigned. A sample workplan containing steps of the STP readiness assessment process is provided as FIG. 5A, with a project timeline set forth at FIG. 5B and a team composition guidelines chart set forth at FIG. 5C, both of which key into the workplan set forth in FIG. 5A. In addition, once work has begun, maintenance of the work plan includes the modification of project deliverables as necessary, as well as maintaining the work plan timing, resource allocation, and due dates throughout the fluid diagnostic process. The frequency of status reporting to the project stakeholders needs to be determined. In addition, key diagnostic project milestones and on-time status needs to be tracked.

As key issues surface, a project issue log, which may be implemented as a table formatted in a word processing program, should be used to capture and track issue status, issue criticality, and issue resolution. The status of the various key issues can be monitored by tracking the target resolution date of each issue and the level of criticality assigned to each particular issue (high, medium, low). The project issue log may be used to report the status of key issues to the project stakeholders. The project issue log template is designed to be modified easily as necessary to suit the needs of this diagnostic.

As discussed above, communication with project sponsors and stakeholders is a vital portion of managing the STP readiness assessment. The work plan should be reviewed to determine meeting schedules and participants for project updates. The project update presentations themselves should be content tailored to each audiences' need for detail. Furthermore, additional communication pieces in the form of newsletters and marketing material may be useful for larger audiences (e.g. employees, clients).

A second important step of the STP readiness assessment is an information gathering and analysis step 120 of determining the critical issues on which to focus the assessment. A preliminary subtask of this step involves reviewing strategies of major business units, which involves obtaining and reviewing the documents necessary to get an understanding of the future focus of the organization. Major changes that will require new capabilities should be identified. Observations and unanswered questions identified in this preliminary review should be added to an interview guide. This interview guide should be used to conduct executive interviews. Executives whose perspectives are required to answer the questions contained in the interview guide should be interviewed. The interviews of each executive should be scheduled and entered into the workplan as necessary. After each interview is conducted, an electronic copy of the interview guide should be used to capture the interviewer's notes of the interview, as well as the name of the interviewee and the date of the interview. A sample of an interview guide used in one embodiment of the present invention is shown in FIG. 6. Critical STP issues and implications should be extracted from the electronic interview notes and should be placed in the STP issue log. Finally, trade process flows for the current (non-STP) environment, a T+1 STP environment, and a T+0 STP environment should be reviewed as a starting point to develop an STP business architecture and process definition. Each process in the system whose STP readiness is being assessed should be articulated in terms of the characteristics in the T+1/T+0 process definitions. Examples of a trade process flow diagram for the current environment, and a trade process flow diagram for the T+1 environment, and a trade process flow diagram for the T+0 environment used in one embodiment of the present invention are provided as FIGS. 7A–7C, respectively. Finally, using the information gathered in this step, the timing and resource allocation in the work plan should be examined to determine whether it is accurate, and any needed modifications should be accomplished.

A third step in the STP readiness assessment process is to establish a factual baseline of the current business and technology environment 130 and to identify issues relating to the areas of largest gaps and greatest potential improvement in terms of business processes and technology. The first subtask in the process is to gather data on human resource utilization and level of automation across the organization. Human resource utilization is reflected by the measure "FTE", or Full Time Equivalent along defined business processes. Level of Automation (LOA) is reflected by an estimate of the percentage the defined business processes are automated by core and non-core systems. The following data are collected from various departments: FTE data by process/activity, level of automation (core and non-core systems) by process/activity, and core systems used and number of non-core systems used in each process/activity. The FTE/LOA data collection may use three applicable templates: an FTE detailed template, a core systems automation template, and a non-core systems automation template. All three worksheets are preferably organized by business process and activities within the process using process definitions from a financial markets business model such as those disclosed in the document entitled "Global Financial Markets Business Integration Architecture: FM Process Definitions", Andersen Consulting, July 1996. The departments from which the data will be collected should be validated and modified.

In gathering FTE data, each department should allocate the total number of FTEs in that department across the defined business activities. For LOA data, the level of automation (LOA) is expressed by the percentage a business activity is automated. For each activity performed by the department, the name(s) of any core systems used, as well as the number of non-core systems (e.g. spreadsheet) that may be used should be indicated. In addition, the percentage of activity that is currently automated by the identified core system(s) or non core system(s) should be estimated and recorded in the survey. Preferably, cells that do not apply should be left blank instead of entering value 0. Data input files from each department should be collected, validated, and aggregated into three data input files corresponding to FTEs, core systems automation, and non-core systems automation. Once this data has been aggregated, all three completed data input forms should be imported by clicking the Import Data button and selecting the corresponding data file. After all data files have been imported, reports may be generated and viewed.

Another subtask of the process step of establishing a process and technology baseline involves the gathering of volume data. In order to assess the STP impact of changing business environment and increasing transaction volumes, an understanding of relationship between the magnitude of the change in key volume drivers and the impact on business competency in the areas of people, process, and technology is required. Volume data such as: current and future volumes for each key volume driver in the high impact processes, the competency (people/process/technology) that will be impacted by each volume driver, and comments regarding the volume impact, should be collected.

High impact processes and key volume drivers may initially be identified on a data input file from a standard template or from past STP readiness assessments, and may be validated and modified as required to encompass the scope of the assessment. Data regarding current volume and management's forecast on future volume should be collected for each volume driver and recorded on a data input file. In addition, the competencies (people/process/technology) that will be impacted by each volume driver should be identified by flagging the appropriate cell, and comments regarding volume impact should be recorded in the "comments" column on a data input file. The completed volume data input file may then be imported into a database using the standard mechanism for the software program.

Data analysis regarding the process and technology baseline may be conducted on several levels. First, the FTE and Automation analysis illustrates the human resource allocation and technology coverage in the current operation environment. By recognizing activities with a high level of manual process and low technology coverage within each process, a base is provided to identify process automation and FTE reduction opportunities. In a preferred embodiment of the present invention, FTE-Automation reports may be generated (1) by selected automation level and process, (2) by selected FTE level and process, and (3) by FTE level.

Second, a process fragmentation report may be generated. A process fragmentation analysis illustrates the distribution of business processes across multiple departments and identifies processes with high numbers of hand-offs. These potentially fragmented processes should be the focus of the process review workshops of step 140, in order to further assess the STP readiness of these processes and identify areas with potential gaps, streamlining, and improvement opportunity.

The impact of changing business volume may also be the subject of an analysis and report using the FTE, Automation, and Volume data generated in step 130. The volume impact analysis identifies the competency which will have the most volume impact and will require the most improvements in order to address the increasing volume across each of the high impact processes and across a particular business competency (people/process/technology) for all high impact processes. Finally, any critical issues uncovered in this process and technology baseline analysis, such as any potentially fragmented processes, should be recorded and included as a focus of the process review workshops of step 140.

A fourth step 140 in the STP readiness assessment process shown in FIG. 1 is to conduct process review workshops. Conducting process review workshops aids in (1) confirming the issues identified from the establish process and technology baselines step, (2) contrasting the current environment with the desired future state, and (3) scoring each process with respect to its STP readiness. Workshops for defined process groups should be organized around the value chain groupings of (1) client servicing and development, (2) investment advice, trading, and brokering, (3) asset/liability servicing, and (4) enterprise management, where each value chain grouping comprises a plurality of processes. The scope of a workshop may include an entire value chain grouping, a subset (plurality) of processes within the grouping, a single process within the grouping or a set of activities within a single process. For the purpose of organizing workshops, preferably those processes that will have a high/medium impact as a result of STP will be identified as focus areas, such as those processes that may be shown on an STP Impact Heat Map, such as those shown in FIGS. 8A and 8B.

In each workshop, T+1 and T+0 business architecture and future state process definitions such as those created in the identification of critical issues step 120 should be reviewed. Critical issues identified in the identification step 120 and the process and technology review step 130, and captured in the STP critical issues log should be reviewed. The FTE, automation, and volume analysis from step 130 should also be reviewed. The T+1 and T+0 STP desired states as shown in FIGS. 7B and 7C should be discussed and documented. The STP desired state for each process should then be discussed in the workshop in relation to the current state for that process as captured in steps 120 and 130 of FIG. 1, and the current gap between the current and STP desired states should be discussed, assessed, and documented in relation to the current state, an example of which is shown in FIG. 7A.

A score should be applied to each process/activity to assess its STP impact and readiness. The STP score may be used as a guide in ranking and assigning priorities to improvement recommendations that may be formulated in later steps of the STP readiness assessment process shown in FIG. 1. An STP impact score and a gap score may be assigned in both the T+1 and T+0 environments for each process/activity evaluated, and comments regarding the current gap and the desired state may be recorded along side the scores. The STP impact score may be classified as levels of impact between the ranges of 1 and 5, where 1 is no impact, and 5 is high impact. T+1 impact is defined as the challenges presented by meeting the more compressed time frames imposed by T+1 settlement of domestic equities. T+0 impact is characterized by not only same-day settlement of securities, but also by the broader need to become an electronic commerce enabled enterprise capable of operating using STP beginning and ending with the investor or end customer. For each process/activity, a STP impact score should be assigned for both the T+1 and the T+0 environments.

Similarly, in computing a gap score, levels of gap for each process/activity being evaluated are defined between 1 and 5, where a level 1 gap means there is no gap, and a level 5 gap means there is a significant gap. The gap is defined as the improvements that need to be made on the current business competency in order to achieve the desired state. For each process/activity, a gap score should be assigned for both the T+1 and T+0 environments. The overall STP score for each activity may be calculated using the following formula: STP score=(80%×STP Impact Score)+(20%×Gap Score). The STP score for each process is the average of the STP score for each activity within the process. A high score indicates that the activity has a large potential impact and a large gap between the current state and the desired state.

A fifth step 150 in the STP readiness assessment process is to review the STP initiatives of the securities industry, the business partners, and the vendors of the enterprise whose securities processing system is being assessed in the system and method of the present invention. The purpose of this step is to help understand the impact of the industry in general, as well as business partners and vendors on the STP readiness of the securities processing system being assessed.

A first subtask 415E of this step is to update the understanding of industry level STP. Personnel involved in the assessment process should obtain current information regarding both domestic and global STP initiatives and study the points of view of various industry players regarding STP. This information, including STP issues and possible industry level solutions/utilities should be communicated to all personnel involved in the STP assessment process. In addition, this information should be integrated into the database component of the system of the present invention through documentation in a Background Information Directory, accessible as item 320 of the main menu shown in FIG. 3.

A second key subtask 420E of step 150 involves reviewing the STP readiness of business partners and vendors of the organization whose STP readiness is being assessed. Business partners and vendors whose STP readiness will have a major impact on the organization and system being assessed by the present invention should be identified, such as pricing feed vendors, corporate action information vendors, custodians/sub-custodians, application vendors, and technical infrastructure vendors. Interviews should be conducted with all identified business partners and vendors. An interview guide similar to that found in FIG. 9 may be used by interviewing personnel to conduct interviews. The interview guide may also be modified as needed to capture the necessary data. After each interview, an electronic copy of the interview guide should be prepared and saved for each interviewee, with the date of the interview and the interview notes recorded on the electronic copy. These interview notes should be used to assess the impact of the business partners'/vendors' STP readiness on the system being assessed by the present invention. A business partner/vendor review template as shown in FIG. 10 may be used to capture findings and conclusions of the impact assessment regarding the business partners/vendors as gleaned from the interview notes.

A sixth step 160 in the STP readiness assessment process shown in FIG. 1 comprises performing a technology assessment to review and assess the level of STP readiness in all applications and infrastructure for the securities processing system being assessed. The first subtask 415F involves mapping the applications to the processes and activities which they support. A Process/Application Map may be used to identify which applications support which business process or activity. An example of a process/application map partially populated with example application information is shown in FIG. 11. The business processes for which corresponding applications should be mapped in a manner similar to that used in establish technology baseline step 130. As stated above, step 130, and now step 160, is preferably derived from and organized by business process and activities within the process, using process definitions from a financial markets business model such as those disclosed in the document entitled "Global Financial Markets Business Integration Architecture: FM Process Definitions", Andersen Consulting, July 1996. After the process/technology map has been completed, the process workshop findings obtained in step 140 should be consulted in order to highlight the processes and applications on the map that are most critical to STP.

A second subtask of step 160, performing the technology assessment, involves conducting a functional/technical assessment of applications. A functional/technical assessment template as shown in FIG. 12 should be modified as necessary and should be populated in the leftmost column 1210 with the applications critical to STP, as determined in the first subtask of step 160. Interviews with executives knowledgeable about each application listed in the assessment template should be conducted and each application listed should be assessed against the functional assessment criteria as well as the technical assessment criteria. Preferably, assessment ratings of (high, medium, and low) are applied for each criteria within each application, and relevant comments may be included for each application regarding the technical assessment and the functional assessment.

A third subtask of step 160, performing the technology assessment, involves conducting an information technology (IT) infrastructure assessment. An IT infrastructure assessment template 1300, as shown in FIG. 13, may be used as a guideline for assessing the current IT infrastructure environment and its ability to support straight through processing. In a preferred embodiment of the present invention, the assessment should focus on four key infrastructure categories: (1) data architecture 1305, (2) computing environment 1310, (3) network environment 1315, and (4) infrastructure environment 1320. Within each infrastructure category, the assessment should include a description of the current environment 1330, a listing of changes 1335 within the infrastructure category required to support STP, key dependencies 1340 for these changes which will need to be examined, the estimated effort 1345 (low effort, medium effort, high effort) required to make the necessary changes to support STP, and possible third-party solutions 1350 to achieving STP support within the IT technology infrastructure. In addition, in conducting the assessments for each IT infrastructure category, certain infrastructure factors necessary to the infrastructure's ability to adapt to and support and STP system should be considered. These considerations include: rapid access to a wide array of databases will be required in an STP environment, scalability, the ability to execute intra-day batches, 24×7 processing capability, the presence of middleware, the presence of sophisticated workflow and messaging management systems, and the ability to achieve real time processing of securities transactions using modular parallel processing.

In addition, as part of the assessment of the current operating environment of each infrastructure category, current IT initiatives should be reviewed for alignment with STP implementation, as shown in step 430F of FIG. 4F. Upcoming IT projects impacting applications and infrastructure critical to STP should be identified, and findings should be documented under the description of the current environment 1330 of the IT infrastructure assessment template. Issues involving upcoming IT projects that require resolution in order to achieve STP implementation should also be separately documented on the STP issues log initiated in step 430B of FIG. 4B.

Solutions, applications, and technologies of vendors, business partners, or the industry in general that may be used in future implementations of the STP architecture should be identified. These observations should be documented in the IT Infrastructure Assessment template 1300 shown in FIG. 13 as possible third party solutions 1350, as well as in the Functional/Technical Assessment template 1200 shown in FIG. 12 as potential applications 1210.

A seventh step 170 in the STP assessment process shown in FIG. 1 includes the development of a roadmap and business case to outline the high level project sequencing and timing and provide guidance for implementing the migration plan to achieve STP. The financial impact of the recommendations should also be assessed and the cost and benefit realizations should be evaluated and confirmed through the development of business cases. A first subtask in step 170 includes formulating and prioritizing process and technology improvement recommendations, as shown in FIG. 4G. Analysis, observation, and issues from the previous steps of the diagnostic should be reviewed with cross functional representation. The findings should be synthesized and conclusions drawn where possible. A list of potential process and technology improvement opportunities and/or remedial projects should be constructed, and these ideas should be captured in an Improvement Recommendation template 1400 as shown in FIG. 14. Quick hits having a shorter time frame for completion should be identified and distinguished from longer term initiatives on the template 1400. Subjective priorities should be assigned to each recommendation listed in the template 1400, using the STP impact scores for the processes that are identified as being impacted by the recommendations. Finally, an estimate for each recommendation should be provided of the programming hours required to complete the recommendation. In addition, for each recommendation, any third parties involved in carrying out the recommendation should be identified.

A second subtask of step 170 involves the creation of a roadmap for achieving STP. This may be accomplished by grouping improvement recommendations in such a way as to create logical projects. Ideas might be grouped by process, application, and desired outcome, for example. Definitions for each project should also be created, including scope, approach, deliverables, timing, and resourcing. Interdependencies among the projects should also be identified, and are preferably captured in the Project Definition template shown in FIG. 15. An example of a roadmap for achieving STP is shown in FIG. 16.

A third subtask of step 170 includes developing a business case for each project. A business case details the information needed for educated evaluation of the proposed effort. A sample business case template 1700 is shown in FIG. 17. This sample should be reviewed and used to create a business case template that is appropriate for each project identified using the diagnostic methodology and that will meet stakeholder needs. Developing the business case requires thorough attention to every aspect of the project, such as the management sponsor, the objectives, and the estimated costs and benefits. The business case should detail the benefit the project will deliver, and should also specify the total costs and risks involved. The business case should show the complexity of effort required to complete the project. The business case should also include detailed plans for managing risk, migration, and other non-economic considerations. Finally, the business case requires executive acceptance of accountability for delivering value in the project, and delivering the project on time and under budget. The results of the analyses conducted with respect to the business case for a particular project should help determine whether that particular project is sustainable. For projects that do not have a sustainable business case, the recommendations should be revisited and the potential solutions recrafted in a more feasible way.

A business case 1700 comprises six main components. The project name section 1710 should provide a brief overview of the project concept and the strategy it supports. Management committee sponsor section 1720 should identify the management champion of the project, accountable for the successful delivery of the project within the specified time and budget parameters. Objectives section 1730 defines parameters for completing the project, such as completing the project within specified budgetary or time constraints Objectives section 1730 also defines goals to be accomplished through completion of the project, such as creation of a new design or process, making a current design or process more efficient, and providing project personnel with personal development opportunities.

Implementation considerations section 1740 provide illumination on how the project defined in the business case fits into the current organization. Factors to be considered in section 1740 include assessing the feasibility of implementing the project proposed in the business case, including identifying internal resources available for implementing the proposed project, critical dependencies to consider within the current process, and organizational barriers and/or capabilities to completing the project. Implementation considerations section 1740 should also include an evaluation of the risks of not taking immediate action, such as losing the advantage of being the "first mover" with respect to the competitive marketplace, and missing out on the short window of opportunity for deriving maximum benefits from completing the project.

Business impact section 1750 sets forth an economic assessment 1752 of the value of the project, as well as an non-economic assessment 1754 of the non-financial qualitative and quantitative implications of the project. In the economic assessment 1752, the project personnel responsible for executing the diagnostic methodology of the present invention should evaluate such factors as the incremental contribution to gross margin, and the incremental level income payback. The economic assessment should also include an evaluation of the financial attractiveness of the business case, including an assessment of such factors as incremental level income, a discounted cash flow analysis, and the return on investment (ROI). All costs associated with launching the project should also be included in economic assessment 1752, including COGS (cost of goods sold), labor costs, capital expenditures, marketing costs, and ongoing support costs. Non-economic assessment 1754 should seek to develop an understanding of the non-financial implications of the project, including customer satisfaction, employee satisfaction, and operational improvements.

Finally, the workplan component 1760 of the business case integrates project objectives, considerations, and assessments discussed above in order to develop a comprehensive plan for completing the project. The workplan section 1760 of business case 1700 should include a listing of all major activities within the project. The time and resources required to complete these activities should be identified. Key milestone dates should be determined. Responsibility for overseeing and executing project activities should be delegated and assigned. The workplan 1760 should also articulate key deliverables for each activity. Furthermore, efforts and resources required for the project should be coordinated with other concurrent projects. Key success factors and metrics for evaluating project progress should also be developed and identified in order to track project performance.

The final step 180 of the STP readiness assessment project constitutes developing an implementation plan for STP migration. A project management software tool such as Microsoft Project™ may be used to create the detailed implementation plan for STP migration in a manner well known in the art. The Microsoft Project™ tool may be used to track resource utilization, project status, project dependencies, and to estimate project costs. The project management step 110 discussed above will also be continued on an ongoing basis as set forth in the implementation plan generated to help track progress and status reporting, resolve issues, and communicate with key sponsors.

Having described the invention in terms of a preferred embodiment, it will be recognized by those skilled in the art that various types of general purpose computer hardware and computer software application programs may be substituted for the configurations described above to achieve an equivalent result. The foregoing detailed description should be regarded as illustrative rather than limiting and the appended claims, including all equivalents, are intended to define the scope of the invention.

The invention claimed is:

1. A method of assessing the ability of a system to apply straight through processing to securities transactions, the method comprising:

identifying one or more assessment issues, the one or more assessment issues relating to automated processing of securities management functions in the system for processing securities transactions, wherein at least one of the one or more assessment issues relates to the ability of the system to apply straight through processing to securities transactions;

storing, on a computer readable medium, the identified one or more assessment issues in an issue and resolution log;

capturing process and technology performance information relating to a current state of the system for implementing automated processing of securities transactions;

storing, on a computer readable medium, the process and technology performance information;

analyzing the process and technology performance information with respect to the one or more assessment issues based on a future state of the system for implementing automated processing of securities transactions;

capturing information regarding the ability of at least one system external to the system to apply automated straight through processing to securities transactions, wherein the at least one system external to the system includes one or more of an industry-wide system, a business partner system, or a vendor system;

storing, on a computer readable medium, the information regarding the abilities of at least one system external to the system to apply straight through processing to securities transactions;

formulating at least one recommendation for improving process and technology performance for the system for applying straight through processing to securities transactions;

prioritizing the at least one recommendation based on the analysis of the technology and performance information; and developing an implementation plan, wherein the implementation plan includes at least one task associated with the at least one recommendation.

2. The method of claim 1, further comprising the step of assessing progress on the at least one task of the implementation plan.

3. The method of claim 1, further comprising the step of managing a plurality of activities for assessing the ability of a system to apply straight through processing to securities transactions.

4. The method of claim 3, wherein the step of managing a plurality of activities for assessing the ability of a system to apply straight through processing to securities transactions further includes:

defining at least one project objective and scope;
developing a communications strategy;
creating a work plan;
recording the status of the at least one project at periodic intervals;
updating the issue and resolution log; and
communicating with key sponsors.

5. The method of claim 4, wherein the step of identifying one or more assessment issues further comprises:

creating and updating an interview guide based on a review of the long term business strategy and plan of major business units;

identifying key executives within the major business units for interview;

conducting interviews with the key executives to identify assessment issues for straight through processing across the system;

summarizing the identified assessment issues;

storing, on a computer readable medium, the identified assessment issues in an issues log;

developing a future state for the system that implements straight through processing; and refining the project scope and work plan in view of information obtained from the interviews conducted with the key executives.

6. The method of claim 5, wherein the step of capturing process and technology performance information for the system further comprises:

defining one or more business processes in the system, wherein each business process includes at least one business activity;

capturing aggregate human capital resource information corresponding to the one or more business processes and the at least one business activity included in each business process;

storing, on a computer readable medium, the aggregate human capital resource information;

capturing aggregate level automation information corresponding to the one or more business processes and the at least one business activity included in each business process;

storing, on a computer readable medium, the aggregate level automation information;

capturing aggregate volume impact information corresponding to the one or more business processes and the at least one business activity included in each business process;

storing, on a computer readable medium, the aggregate volume impact information;

importing the aggregate human capital resource information and the aggregate level of automation information into a system performance database;

generating from data in the system performance database a human capital resource report, an automation report, a process fragmentation report, and an impact of changing business volume report; and creating a list of critical issues based on an analysis of the human capital resource, automation, process fragmentation, and impact of changing business volume reports storing, on a computer readable medium, the list of critical issues.

7. The method of claim 6, wherein the step of analyzing the process and technology performance information with respect to the one or more assessment issues further includes:

identifying business processes and business activities associated with the one or more assessment issues;

assessing for each identified process a current state and a desired state implementing straight through processing; and assigning a straight through processing impact score and a gap score to each identified process.

8. The method of claim 1, wherein the step of capturing information regarding the ability of at least one system external to the system to apply straight through processing to securities transactions further includes:

identifying business partner systems and vendor systems whose implementation of straight through processing will impact the business processes and business activities of the system; and assessing the magnitude of the impact on the system of the readiness of the business partner systems and the vendor systems for implementing straight through processing.

9. The method of claim 1, wherein the step of formulating at least one recommendation for improving process and technology performance for the system further comprises:

identifying technology applications associated with the one or more business processes in the system, wherein each business process includes at least one business activity;

storing, on a computer readable medium the identified technology applications, and assessing the technology applications against a plurality of functional and technical criteria.

10. The method of claim 1, wherein the step of formulating at least one recommendation for improving process and technology performance for the system further comprises:

assessing the ability of the information technology infrastructure of the system to implement straight through processing in the system; and identifying technology applications or information technology infrastructure solutions of the industry-wide system, vendor systems, and business partner systems that may be used to implement straight through processing in the system storing, on a computer readable medium the identified technology applications or information technology infrastructure solutions.

11. The method of claim 1, wherein the step of formulating at least one recommendation for improving process and technology performance for the system further comprises:

identifying current information technology infrastructure initiatives that may impact the ability of the system to implement straight through processing storing, on a computer readable medium, the identified current information technology infrastructure initiatives.

12. The method of claim 1, wherein the step of prioritizing the at least one recommendation further includes:

identifying potential process and technology improvement opportunities;

storing, on a computer readable medium, the identified potential process and technology improvement opportunities;

identifying the business processes affected by the potential process and technology improvement opportunities;

storing, on a computer readable medium, the identified business processes affected by the potential process and technology improvement opportunities; and assigning a priority to each potential process and technology improvement opportunity, where the priority of each potential process and technology improvement opportunity is influenced by straight through processing impact scores assigned to the business processes affected by the potential process and technology improvement opportunities.

13. The method of claim 12, wherein the step of prioritizing the at least one recommendation further includes:

grouping the potential process and technology improvement recommendations into one or more projects;

creating a definition for each project, wherein the project definition includes project scope, project approach, project deliverables, project timing, and project resourcing;

identifying any interdependencies between projects; and storing, on a computer readable medium, the identified interdependencies between projects.

14. The method of claim 13, wherein the step of prioritizing the at least one recommendation further includes:

developing a business case for each project;

estimating the costs of each project; and analyzing the costs of each project with respect to the potential benefits of the project.

15. A computer assisted diagnostic system for assessing the readiness of a system for adopting a straight through processing trading environment, the system comprising:

an initial form having an activatable command button wherein online user documentation is displayed upon activation, an activatable command button wherein a listing accessing background information documents are presented upon activation, an activatable command button wherein execution of a straight through processing data tool program is initiated upon activation, and an activatable command button wherein the initial form is exited upon activation;

online user documentation accessible through the initial programmable form;

one or more background information documents accessible through the initial programmable form;

a straight through processing data tool program comprising plurality of self-contained windows, wherein each self-contained window is associated with one of a plurality of straight through processing readiness assessment steps, wherein a straight through processing step may include one or more substeps, and the plurality of straight through processing readiness assessment steps includes:

identifying one or more assessment issues, the one or more assessment issues relating to automated processing of securities management functions in the system for processing securities transactions;

storing, on a computer readable medium, the identified one or more assessment issues in an issue and resolution log;

capturing process and technology performance information relating to a current state of the system for processing securities transactions for the system;

storing, on a computer readable medium, the process and technology performance information;

analyzing the process and technology performance information with respect to the one or more assessment issues based on a future state of the system for processing securities transactions;

capturing information regarding the ability of at least one system external to the system to apply automated straight through processing to securities transactions, wherein the at least one system external to the system includes one or more of an industry-wide system, a business partner system, or a vendor system;

storing, on a computer readable medium, the information regarding the abilities of at least one system external to the system to apply straight through processing to securities transactions;

formulating at least one recommendation for improving process and technology performance for the system for processing securities transactions;

prioritizing the at least one recommendation based on the analysis of the technology and performance information; and developing an implementation plan, wherein the implementation plan includes at least one task associated with the at least one recommendation.

16. The method of claim 15, further comprising the step of assessing progress on the at-least one task of the implementation plan.

17. The method of claim 15, further comprising the step of managing a plurality of activities for assessing the ability of a system to apply straight, through processing to securities transactions.

18. The computer-assisted diagnostic system of claim 17, wherein the step of managing a plurality of activities for assessing the ability of a system to apply straight through processing to securities transactions further includes:

defining at least one project objective and scope;
developing a communications strategy;
creating a work plan;
recording the status of the at least one project at periodic intervals;
updating the issue and resolution log; and
communicating with key sponsors.

19. The computer-assisted diagnostic system of claim 18, wherein the step of identifying one or more assessment issues further comprises:

creating and updating an interview guide based on a review of the long term business strategy and plan of major business units;
identifying key executives within the major business units for interview;
conducting interviews with the key executives to identify assessment issues for straight through processing across the organization;
summarizing the identified assessment issues;
storing, on a computer readable medium, the identified assessment issues in an issue and resolution log;
developing a future state for the system that implements straight through processing; and
refining the project scope and work plan in view of information obtained from the interviews conducted with the key executives.

20. The computer-assisted diagnostic system of claim 19, wherein the step of capturing process and technology performance information for system further comprises:

defining one or more business processes in the system, wherein each business process includes at least one business activity;
capturing aggregate human capital resource information corresponding to the one or more business processes and the at least one business activity included in each business process;
storing, on a computer readable medium, the aggregate human capital resource information;
capturing aggregate level automation information corresponding to the one or more business processes and the at least one business activity included in each business process;
storing, on a computer readable medium, the aggregate level automation information;
capturing aggregate volume impact information corresponding to the one or more business processes and the at least one business activity included in each business process;
storing, on a computer readable medium, the aggregate volume impact information;
importing the aggregate human capital resource information, the aggregate level of automation information, and the aggregate volume impact information into a system performance database;
generating from data in the system performance database a human capital resource report, an automation report, a process fragmentation report, and an impact of changing business volume report; and
updating the issue and resolution log based on an analysis of the human capital resource, automation, process fragmentation, and impact of changing business volume reports.

21. The computer-assisted diagnostic system of claim 20, wherein the step of analyzing, the process and technology performance information with respect to the one or more assessment issues further includes:

identifying business processes and business activities associated with the one or more assessment issues;
storing, on a computer readable medium, the identified business processes and business activities;
assessing for each identified process a current state and a desired state implementing straight through processing; and
assigning a straight through processing impact score and a gap score to each identified process.

22. The computer-assisted diagnostic system of claim 15, wherein the step of capturing information regarding the ability of at least one system external to the system to apply straight through processing to securities transactions further includes:

identifying business partner systems and vendor systems whose implementation of straight through processing will impact the business processes and business activities of the system; and
assessing the magnitude of the impact on the system of the readiness of the business partner systems and the vendor systems for implementing straight through processing.

23. The computer-assisted diagnostic system of claim 15, wherein the step of formulating at least one recommendation for improving process and technology performance for the system further comprises:

identifying technology applications associated with the one or more business processes in the system, wherein each business process includes at least one business activity; and
assessing the technology applications against a plurality of functional and technical criteria.

24. The computer-assisted diagnostic system of claim 15, wherein the step of formulating at least one recommendation for improving process and technology performance for the system further comprises:

assessing the ability of the information technology infrastructure of the securities processing system to implement straight through processing in the system; and
identifying technology applications or information technology infrastructure solutions of the industry-wide system, vendor systems, and business partner systems that may be used to implement straight through processing in the system;

storing, on a computer readable medium, the identified technology applications or information technology infrastructure solutions.

25. The computer-assisted diagnostic system of claim 15, herein the step of formulating at least one recommendation for improving process and technology performance for the system further comprises:
    identifying current information technology infrastructure initiatives that may impact the ability of the system to implement straight through processing.

26. The computer-assisted diagnostic system of claim 15, wherein the step of prioritizing the at least one recommendation further includes:
    identifying potential process and technology improvement opportunities;
    identifying the business processes affected by the potential process and technology improvement opportunities; and
    assigning a priority to each potential process and technology improvement opportunity, where the priority of each potential process and technology improvement opportunity is influenced by straight through processing impact scores assigned to the business processes affected by the potential process and technology improvement opportunities.

27. The computer-assisted diagnostic system of claim 26, wherein the step of prioritizing the at least one recommendation further includes:
    grouping the potential process and technology improvement recommendations into one or more projects;
    creating a definition for each project, wherein the project definition includes project scope, project approach, project deliverables, project timing, and project resourcing; and
    identifying any interdependencies between projects;
    storing, on a computer readable medium, the identified interdependencies between projects.

28. The computer-assisted diagnostic system of claim 27, wherein the step of prioritizing the at least one recommendation further includes:
    developing a business case for each project;
    estimating the costs of each project; and
    analyzing the costs of each project with respect to the potential benefits of the project.

* * * * *